US011281911B2

(12) United States Patent
Yang et al.

(10) Patent No.: US 11,281,911 B2
(45) Date of Patent: Mar. 22, 2022

(54) 2-D GRAPHICAL SYMBOLS FOR REPRESENTING SEMANTIC MEANING OF A VIDEO CLIP

(71) Applicant: GYRFALCON TECHNOLOGY INC., Milpitas, CA (US)

(72) Inventors: Lin Yang, Milpitas, CA (US); Baohua Sun, Fremont, CA (US); Hao Sha, San Jose, CA (US)

(73) Assignee: GYRFALCON TECHNOLOGY INC., Milpitas, CA (US)

( * ) Notice: Subject to any disclaimer, the term of this patent is extended or adjusted under 35 U.S.C. 154(b) by 311 days.

(21) Appl. No.: 16/674,910

(22) Filed: Nov. 5, 2019

(65) Prior Publication Data
US 2020/0342232 A1 Oct. 29, 2020

Related U.S. Application Data

(60) Provisional application No. 62/839,633, filed on Apr. 27, 2019.

(51) Int. Cl.
*G06K 9/00* (2006.01)
*G06K 9/62* (2022.01)
(Continued)

(52) U.S. Cl.
CPC ....... *G06K 9/00718* (2013.01); *G06K 9/6223* (2013.01); *G06K 9/6256* (2013.01); *H04N 19/114* (2014.11); *H04N 19/124* (2014.11)

(58) Field of Classification Search
CPC .......... G06N 3/0454; G06N 3/08; G06N 3/04; G06N 3/063; G06N 3/082; G06N 5/022;
(Continued)

(56) References Cited

U.S. PATENT DOCUMENTS 5,067,164 A    11/1991 Denker et al.
6,519,363 B1   2/2003  Su et al.
(Continued)

OTHER PUBLICATIONS

Yanzhen Ren, Dengkai Liu, Qiaochu Xiong, Jianming Fu, and Lina Wang, Spec-ResNet: A General Audio Steganalysis Scheme based on a Deep Residual Network for Spectrograms, Feb. 2019. IEEE (Year: 2019).*

(Continued)

*Primary Examiner* — Alex Kok S Liew

(57) ABSTRACT

P feature encoding values are obtained for each of the Q frames in a video clip by image transformations of each frame along with performing computations of a specific succession of convolution and pooling layers of a CNN based deep learning model followed with operations of a nested invariance pooling layer. Each feature encoding value is then converted from real number to a corresponding integer value within a range designated for color display intensity according to a quantization scheme. A 2-D graphical symbol that contains N×N pixels is formed by placing respective color display intensities into the N×N pixels according to a data arrangement pattern for representing all frames of the video clip in form of P×Q feature encoding values, such that the 2-D graphical symbol possesses a semantic meaning of the video clip that can be recognized via image classification task using another trained CNN based deep learning model.

13 Claims, 29 Drawing Sheets

(51) Int. Cl.
*H04N 19/114* (2014.01)
*H04N 19/124* (2014.01)

(58) Field of Classification Search
CPC .... G06N 3/0445; G06N 3/084; G06N 3/0481;
G06N 3/0472; G06N 20/10; G06N 3/088;
G06N 5/003; G06N 3/10; G06N 20/00;
G06N 3/086; G06N 5/04; G06N 3/02;
G06N 5/046; G06N 7/005; G06T
2207/20084; G06T 2207/30242; G06T
7/70; G06T 2207/20024; G06T
2207/20052; G06T 2207/20056; G06T
2207/20064; G06T 7/223; G06T 9/002;
G06T 2207/10016; G06T 7/11; G06T
2207/20081
See application file for complete search history.

(56) References Cited

U.S. PATENT DOCUMENTS

| | | | |
|---|---|---|---|
| 6,665,436 | B2 | 12/2003 | Su et al. |
| 6,941,513 | B2 | 9/2005 | Meystel et al. |
| 8,321,222 | B2 | 11/2012 | Pollet et al. |
| 8,726,148 | B1 | 5/2014 | Battilana |
| 9,026,432 | B2 | 5/2015 | Zangvil |
| 2003/0108239 | A1 | 6/2003 | Su et al. |
| 2003/0110035 | A1 | 6/2003 | Thong et al. |
| 2008/0130996 | A1 | 6/2008 | Sternby |
| 2009/0048841 | A1 | 2/2009 | Pollet et al. |
| 2010/0158394 | A1 | 6/2010 | Chang et al. |
| 2010/0286979 | A1 | 11/2010 | Zangvil et al. |
| 2013/0002553 | A1 | 1/2013 | Colley |
| 2013/0060786 | A1 | 3/2013 | Serrano et al. |
| 2014/0040270 | A1 | 2/2014 | O'Sullivan et al. |
| 2014/0355835 | A1 | 12/2014 | Rodriguez-Serrano et al. |
| 2015/0193431 | A1 | 7/2015 | Stoytchev et al. |
| 2017/0004184 | A1 | 1/2017 | Jain et al. |
| 2017/0011279 | A1 | 1/2017 | Soldevila et al. |
| 2017/0032035 | A1 | 2/2017 | Gao et al. |
| 2017/0177710 | A1 | 6/2017 | Burlik |
| 2018/0060302 | A1 | 3/2018 | Liang et al. |
| 2018/0150457 | A9 | 5/2018 | Stoytchev et al. |
| 2018/0150956 | A1 | 5/2018 | Kao et al. |
| 2019/0043203 | A1* | 2/2019 | Fleishman ............... G06N 3/04 |

OTHER PUBLICATIONS

Ting Yao, Yehao Li, Zhaofan Qiu, Fuchen Long, Yingwei Pan, Dong Li, and Tao Mei, MSR Asia MSM at ActivityNet Challenge 2017 Trimmed Action Recognition, Temporal Action Proposals and Dense-Captioning Events in Videos, 2017 (Year: 2017).*
Shur et al. "A Corpus of Natural Language for Visual Reasoning", 2017, Facebook AI Research, Menlo Park, CA.
Koon Kim, "Convolutional Neural Networks for Sentence Classification", Sep. 2014, New York University.
Rastegari et al. "XNOR-Net: ImageNet Classification Using Binary Convolutional Neural Networks", Aug. 2, 2016, Allen Institute for AI, Univ. of Washington.
Gysel et al. "Hardware-Oriented Approximation of Convolutional Neural Networks", Oct. 20, 2016, Department of Electrical and Computer Engineering, University of California, Davis, CA.
Morere et al. "Nested Invariance Pooling and RBM Hashing for Image Instance Retrieval", Apr. 14, 2016, Institute for Infocomm Research, A*STAR, Singapore.

* cited by examiner

ZxZ pixel locations (Z/2)x(Z/2) pixel locations

2-D GRAPHICAL SYMBOLS FOR REPRESENTING SEMANTIC MEANING OF A VIDEO CLIP

CROSS-REFERENCE TO RELATED APPLICATIONS

This application claims benefits of a U. S. Provisional Patent Application Ser. No. 62/839,633 for "2-D Symbol For Graphically Representing Feature Encoding Values Of A Video Clip", filed Apr. 27, 2019. The contents of which are hereby incorporated by reference in its entirety for all purposes.

FIELD

This patent document relates generally to the field of machine learning. More particularly, the present document relates to creating a two-dimension (2-D) graphical symbol for representing semantic meaning of a video clip.

BACKGROUND

Machine learning is an application of artificial intelligence. In machine learning, a computer or computing device is programmed to think like human beings so that the computer may be taught to learn on its own. The development of neural networks has been key to teaching computers to think and understand the world in the way human beings do.

Video stream data contain a series of still images, for example, a typical 30 frames per second of images. Generally, a still image is a snapshot of an action, while a video stream shows the action. For example a snapshot of a person swims in a pool is a person in a swimming pool, while video shows a person is doing freestyle swim strokes. To recognize the action contained in a video stream must be done by video classification technique. Therefore, there would be a need to efficiently recognize the action contained in a video stream via machine learning.

SUMMARY

This section is for the purpose of summarizing some aspects of the invention and to briefly introduce some preferred embodiments. Simplifications or omissions in this section as well as in the abstract and the title herein may be made to avoid obscuring the purpose of the section. Such simplifications or omissions are not intended to limit the scope of the invention.

Systems and methods of creating two-dimension (2-D) graphical symbols for representing a semantic meaning of a video clip are described.

According to one aspect of the disclosure, a video clip having Q frames of 2-D image is extracted from a video stream received in a computing system. The video stream includes a number of frames with each frame containing a 2-D image in time order. A vector of P feature encoding values is obtained for each frame by a set of image transformations of each frame along with performing computations of a specific succession of convolution and pooling layers of a first Cellular Neural Networks or Cellular Nonlinear Networks (CNN) based deep learning model followed with operations of a nested invariance pooling layer. As a result, the vector of P feature encoding values represents the image of each frame with desired invariance (e.g., rotations, translations and scaling). Each feature encoding value is then converted from real number to a corresponding integer value within a range designated for color display intensity in accordance with a quantization scheme. A 2-D graphical symbol that contains N×N pixels is formed by placing respective color display intensities into the N×N pixels according to a data arrangement pattern for representing all frames of the video clip in form of P×Q feature encoding values, such that the 2-D graphical symbol possesses a semantic meaning of the video clip and the semantic meaning can be recognized via another CNN based deep learning model with trained filter coefficients. P and N are positive integers, and Q is a multiple of 512.

According another aspect, the Q frames are sequentially chosen from the video steam.

According yet another aspect, the Q frames are arbitrarily chosen from the video steam and rearranged in time order.

According yet another aspect, the quantization scheme is a non-linear quantization based on K-means clustering of each of the P feature encoding values obtained using a training dataset.

According yet another aspect, the quantization scheme is a linear quantization based on boundaries determined by empirical observations of all of the feature encoding values obtained using a training dataset.

According yet another aspect, the data arrangement pattern for representing all frames of the video clip comprises arranging all of the P feature encoding values of each frame in a square format such that there are Q square images contained in the 2-D graphical symbol.

According yet another aspect, the data arrangement pattern for representing all frames of the video clip comprises arranging each of the P feature encoding values of all Q frames in a rectangular format such that there are P rectangular images contained in the 2-D graphical symbol.

Objects, features, and advantages of the invention will become apparent upon examining the following detailed description of an embodiment thereof, taken in conjunction with the attached drawings.

BRIEF DESCRIPTION OF THE DRAWINGS

These and other features, aspects, and advantages of the invention will be better understood with regard to the following description, appended claims, and accompanying drawings as follows:

DETAILED DESCRIPTIONS

In the following description, numerous specific details are set forth in order to provide a thorough understanding of the invention. However, it will become obvious to those skilled in the art that the invention may be practiced without these specific details. The descriptions and representations herein are the common means used by those experienced or skilled in the art to most effectively convey the substance of their work to others skilled in the art. In other instances, well-known methods, procedures, and components have not been described in detail to avoid unnecessarily obscuring aspects of the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Used herein, the terms "vertical", "horizontal", "diagonal", "left", "right", "top", "bottom", "column", "row", "diagonally" are intended to provide relative positions for the purposes of description, and are not intended to designate an absolute frame of reference. Additionally, used herein, term "character" and "script" are used interchangeably.

Embodiments of the invention are discussed herein with reference to FIGS. 1-17. However, those skilled in the art will readily appreciate that the detailed description given herein with respect to these figures is for explanatory purposes as the invention extends beyond these limited embodiments.

Figure 1:
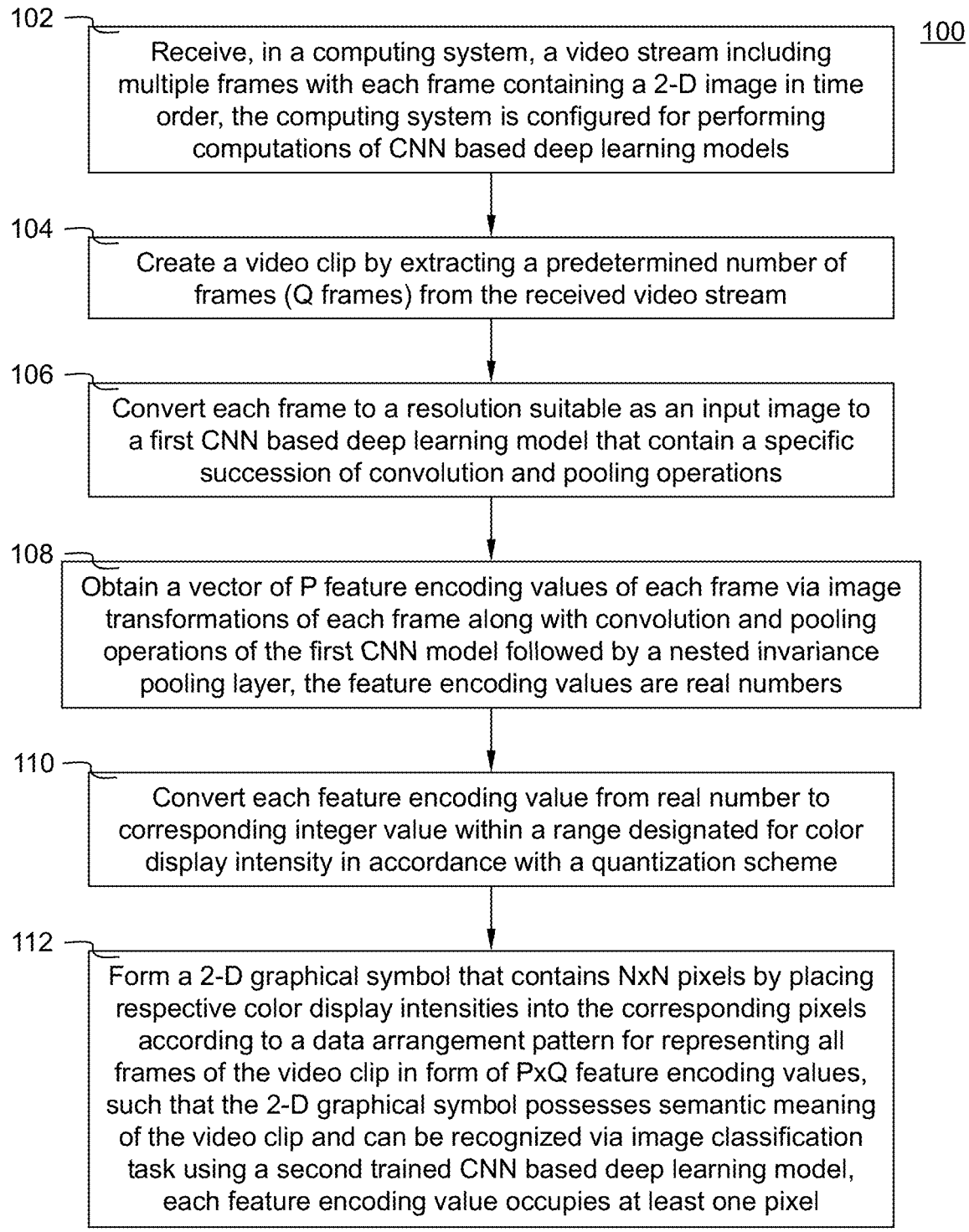
FIG. 1 is a flowchart illustrating an example processes of creating a 2-D graphical symbol for representing semantic meaning of a video clip in accordance with one embodiment of the invention.

Referring first to FIG. 1, a flowchart is illustrated for an example process 100 of creating a two-dimension (2-D) graphical symbol for representing semantic meaning of a video clip. Process 100 is implemented both in software and in hardware.

Figure 8A:
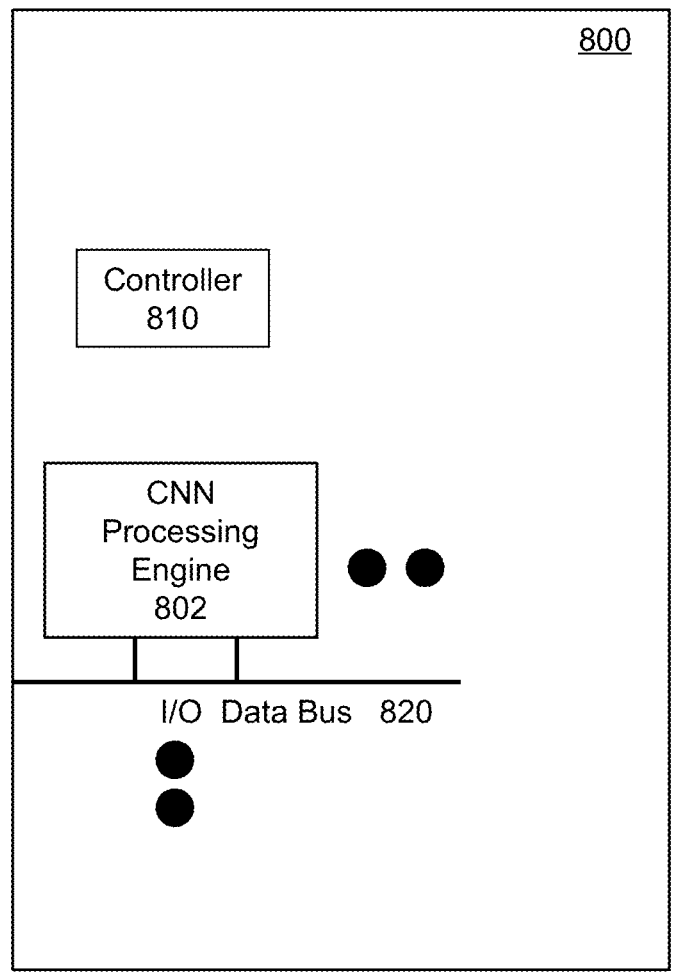
FIG. 8A is a block diagram illustrating an example Cellular Neural Networks or Cellular Nonlinear Networks (CNN) based computing system, according to one embodiment of the invention.

Process 100 starts at action 102 by receiving a video stream in a computer system capable of performing computations of Cellular Neural Networks or Cellular Nonlinear Networks (CNN) based deep learning models, for example, the computing system 800 of FIG. 8A. The video stream contains a number of frames with each frame containing a 2-D image in time order. For example, a typical video stream contains 30 frames per second or high frames per second for capturing slow motion.

Figure 2A:
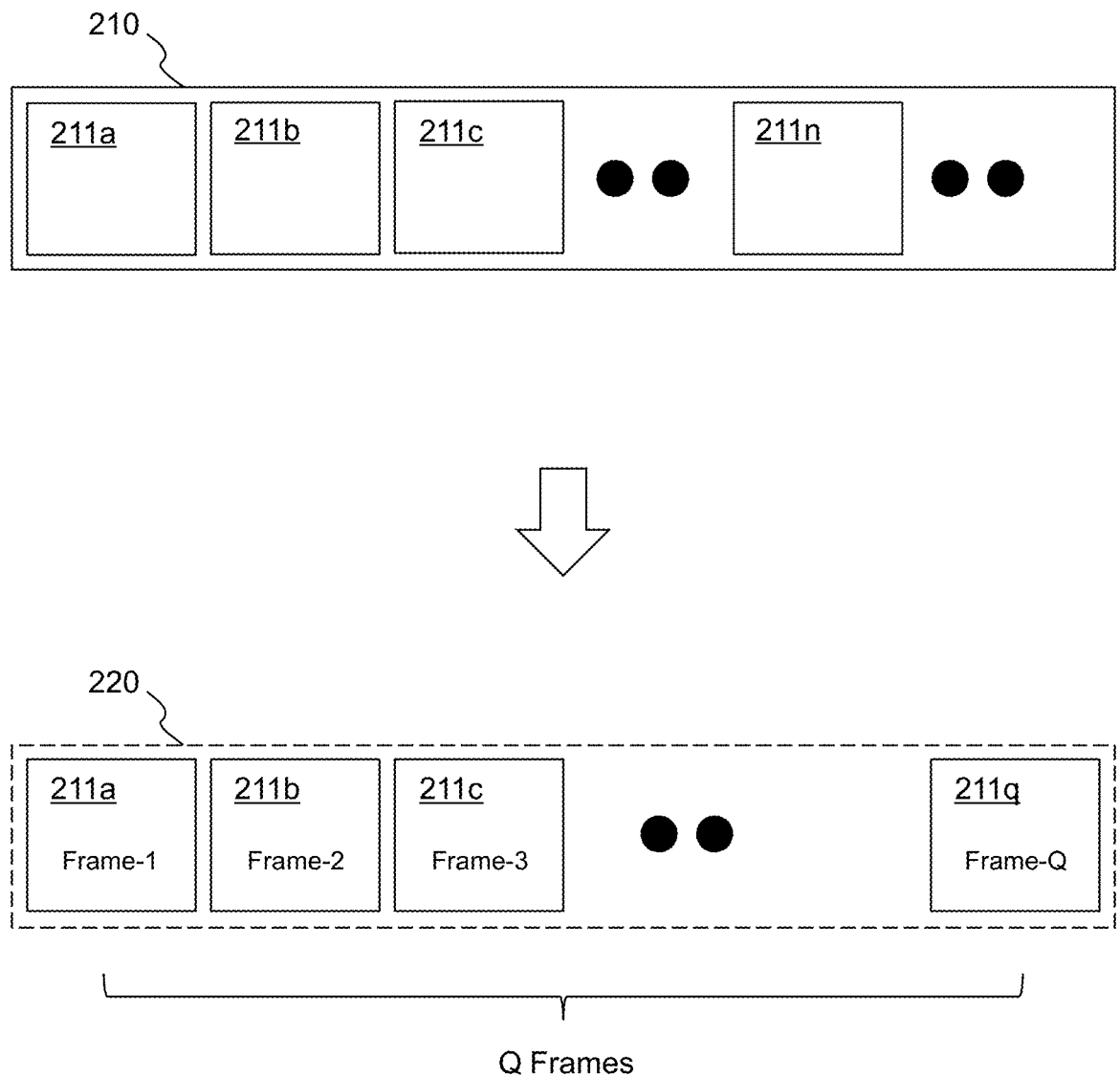
FIGS. 2A-2C are diagrams showing three different example video clips extracted from a video stream in accordance with an embodiment of the invention.

Then, at action 104, a video clip is extracted from the received video stream. The video clip contains a predetermined number of frames (i.e., Q frames). Q is a positive integer. The selection of Q frames may be conducted in a number of manners. In one embodiment, Q frames are sequentially chosen from the video steam. A first example video clip 220 shown in FIG. 2A is formed by selecting first consecutive Q frames 211a-211q from a video stream 210. The video stream 210 contains a number of frames 211a, 211b, . . . , 211n, . . . . Selection of consecutive Q frames can start from any other frame instead of the first frame.

Figure 2B:
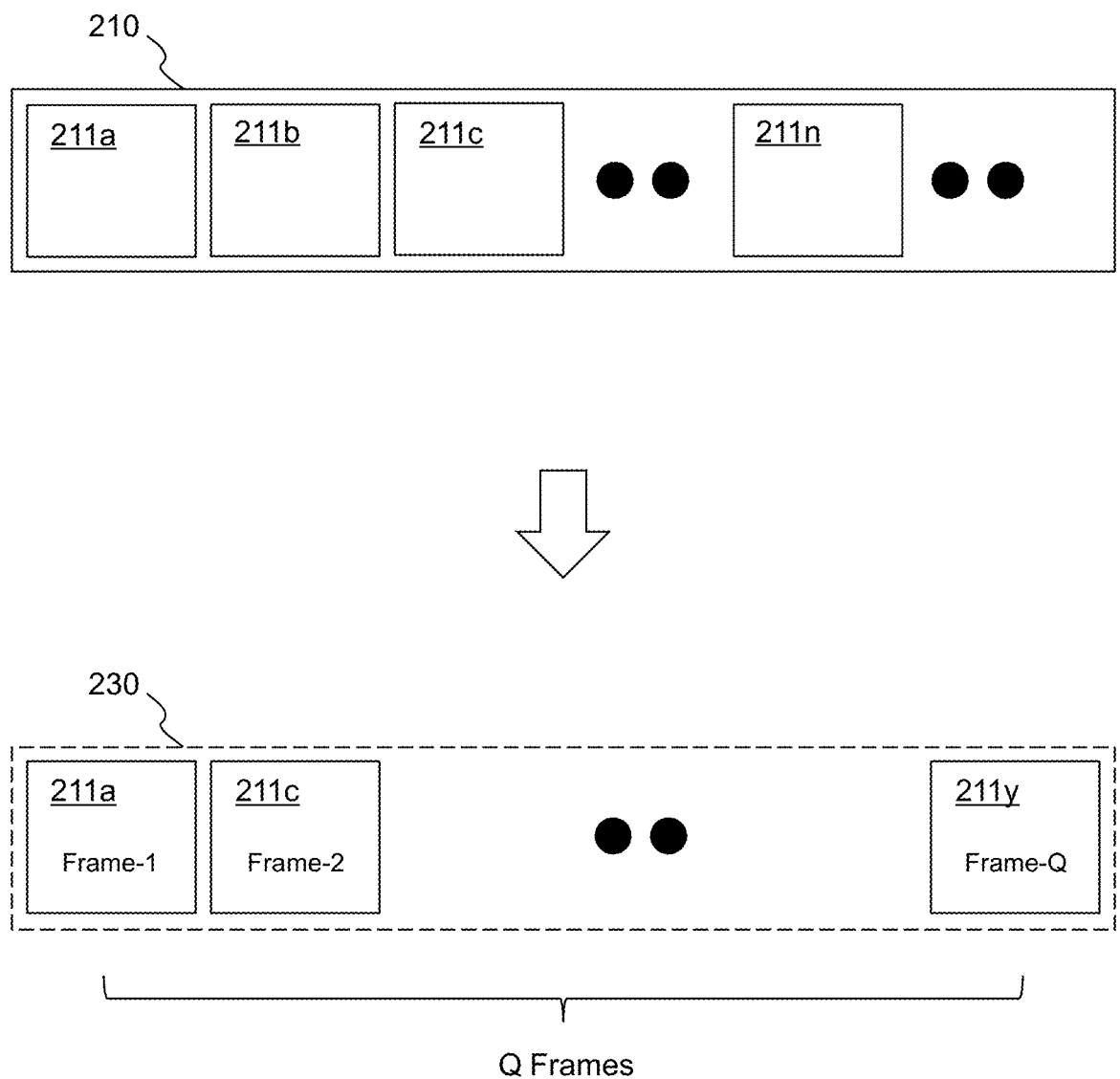
Figure 2C:
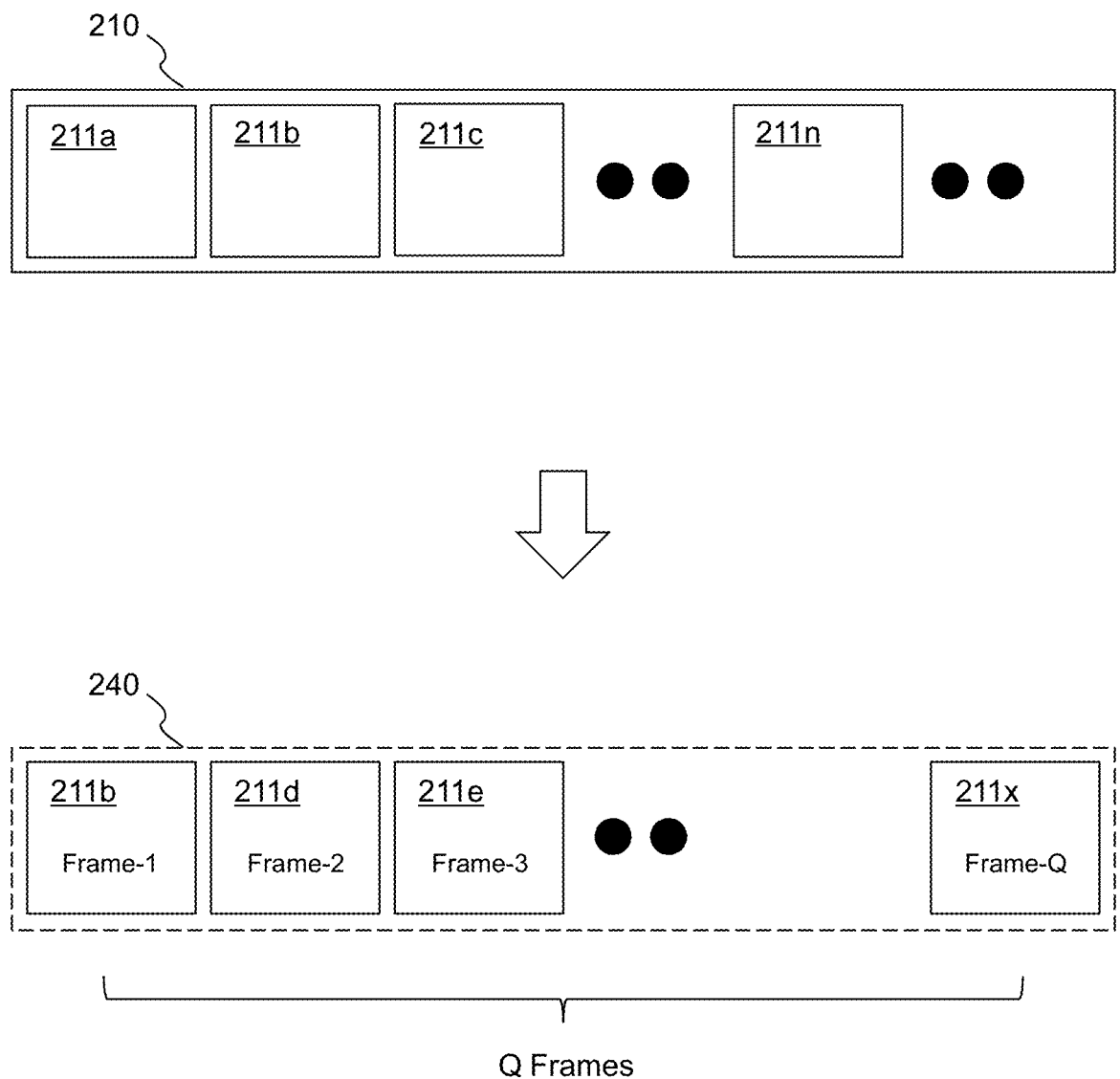

In another embodiment, Q frames are chosen with a criterion, for example, every other frame as shown in FIG. 2B. Odd numbered frames 211a, 211c, . . . , 211y are chosen from the same video stream 210 to form a second video clip 230. Again other criteria may be used, for example, every third frame, etc.

In yet another embodiment, Q frames are arbitrarily chosen from the video steam and rearranged in time order. Shown in FIG. 2C, a third video clip 240 is formed in such a scheme to contain arbitrarily chosen frames 211b, 211d, 211e, . . . , 211x.

Each frame is then converted to a resolution suitable as an input image to a CNN based deep learning model that contains a specific succession of convolution and pooling layers at action 106. For example, Visual Geometry Group's VGG-16 model (shown in FIG. 3B) requires image having an input image resolution of 224×224 pixels.

Next, at action 108, a vector of P feature encoding values is obtained for each frame by a set of image transformations of each frame along with performing computations of a specific succession of convolution and pooling layers of a Cellular Neural Networks or Cellular Nonlinear Networks (CNN) based deep learning model (e.g., VGG-16, ResNet, MobileNet, etc.) followed with operations of a nested invariance pooling layer. P is a positive integer and multiple of 512. In one embodiment, the feature encoding values are referred to as Compact Descriptors for Video Analysis (CDVA) in the MPEG-7 standard. MPEG stands for Moving Picture Experts Group and is an international standard for encoding and compressing video images.

Figure 3A:
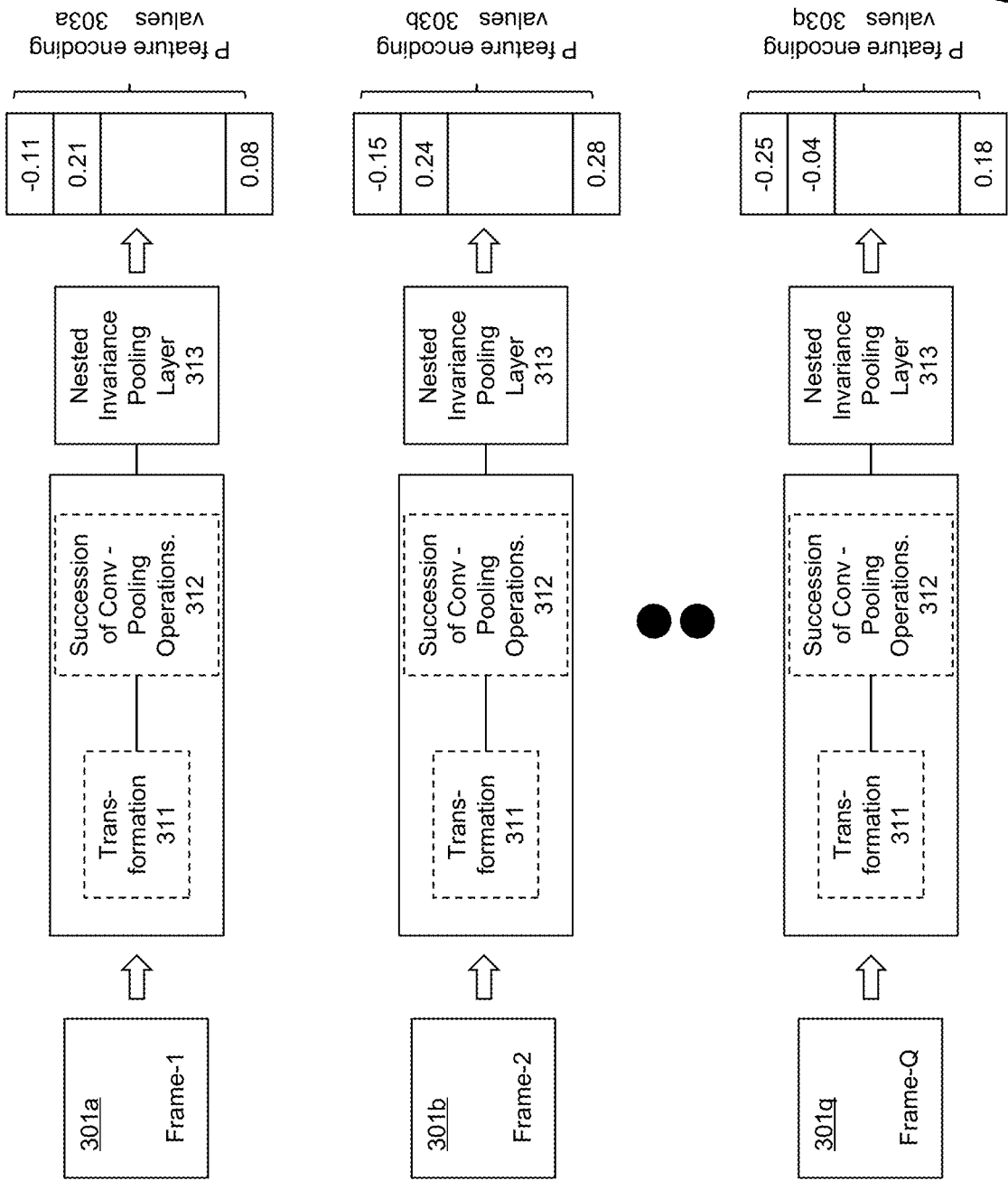
FIG. 3A is a schematic diagram showing respective feature encoding values of each of the Q frames in an example video clip are obtained according to an embodiment of the invention.
Figure 3B:
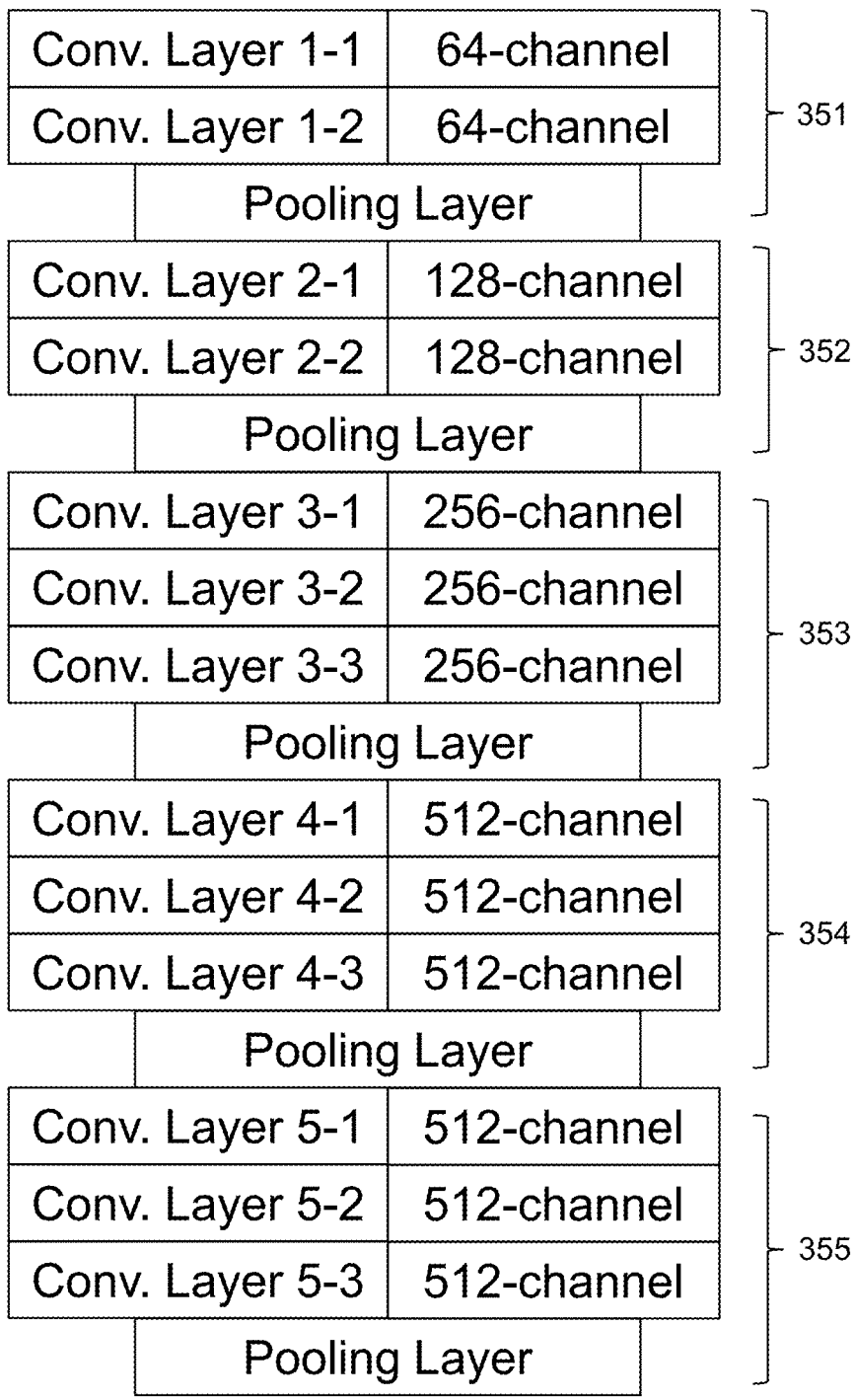
FIG. 3B is a diagram showing an example specific succession of convolution and pooling layers for obtaining feature encoding values of an image in accordance with an embodiment of the invention.

A schematic diagram shown in FIG. 3A is to demonstrate respective P feature encoding values 303a, 303b, 303q are obtained for Q frames 301a, 301b, 301q. 2-D image of each frame is processed by a set of image transformations 311 (e.g., rotations, translations, and/or scaling) along with performing computations of a specific succession of convolution and pooling layers 312 followed with operations of a nested invariance pooling layer 313. As a result of the combination operations 311-313, the vector of P feature encoding values represent image of each frame with desired invariance. The combination operations 311-313 may be performed in the computer system 800. One example set of image transformation is to rotate each frame 90-deg, 180-deg and 270-deg. FIG. 3B shows an example specific succession of convolution and pooling layers (i.e., five groups of convolution/pooling layers 351, 352, 353, 354 and 355) based on VGG 16 model.

Each feature encoding value is a real number and can be either positive or negative, for example, 0.26, −0.01, 0.12, etc.

At action 110, each feature encoding value is then converted from the real number to a corresponding integer value within a range designated for color display intensity in accordance with a quantization scheme. In one embodiment, the range designated for color display intensity is between 0 and 255 for grayscale display.

In one embodiment, the quantization scheme is based on K-means clustering of each of the P feature encoding values obtained using a training dataset.

In grayscale display, applying K-means clustering to each of the P feature encoding values would create 256 clustering centers. Shown in FIG. 4A, the first entry, 0.27, corresponds to integer 255, the second entry, 0.25, also corresponds to 255. The third entry, 0.11, corresponds to 190, and so on. Depending upon the data, the quantization scheme based on K-means clustering may result in uneven distribution of the clustering centers.

Figure 4A:
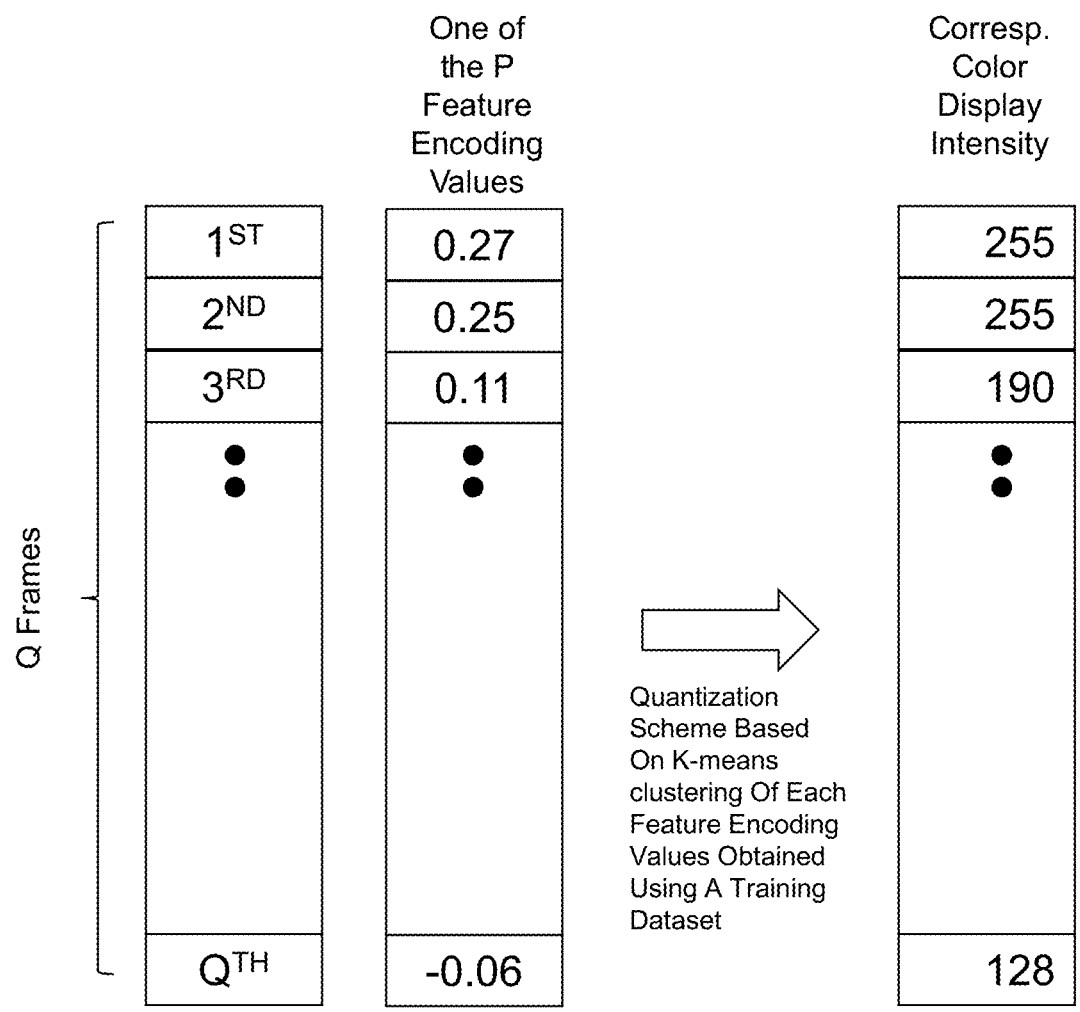
FIGS. 4A-4B are diagrams showing example conversion schemes of feature encoding values from real number to an integer value within a range of color display intensity in accordance with an embodiment of the invention.
Figure 4B:
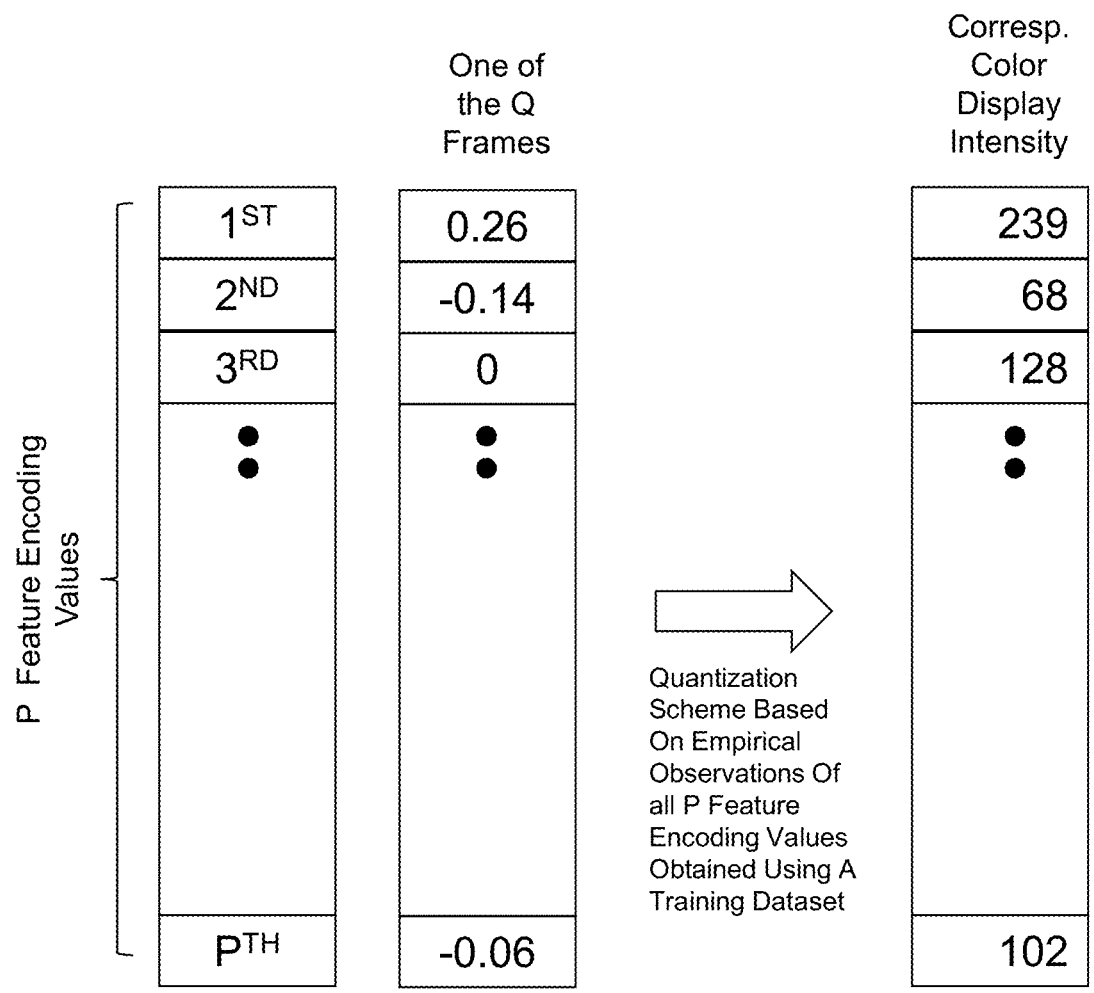

In another embodiment, the quantization scheme is a linear quantization scheme based on boundaries determined in empirical observations of all of the feature encoding values obtained using a training dataset. Then a conversion formula is used for converting real number to a corresponding integer. An example of linear quantization for grayscale display shown in FIG. 4B is as follows:

1) set maximum and minimum boundary values, e.g., max=0.3, min=−0.3,
2) convert the real number $v\_n\_m$ to a corresponding integer $i\_n\_m$ as follows:

$i\_n\_m=(v\_n\_m/(\max-\min))*256+128$, if $v\_n\_m$ is within the range of [min,max]

$i\_n\_m=255$, if $v\_n\_m>\max$ $i\_n\_m=0$, if $v\_n\_m<\min$

For example, shown in FIG. 4B, $v\_1\_1=0.26$, $v\_1\_2=-0.14$ are converted to the following:

$i\_1\_1=(0.26/(0.3-(-0.3)))*256+128=239$ $i\_1\_2=(-0.14/(0.3-(-0.3)))*256+128=68$

Referring back to process 100, at action 112, a 2-D graphical symbol that contains N×N pixels is formed by placing respective color display intensities into the corresponding pixels according to a data arrangement pattern that represents P feature encoding values of all Q frames, such that the 2-D graphical symbol possesses semantic meaning of the video clip. Each feature encoding value occupies at least one pixel. The resulting 2-D graphical symbol can be recognized via an image classification task using another trained CNN based deep learning model. In order to accomplish such an image classification task, labeled 2-D graphical symbols (e.g., symbol with data arrangement patterns shown in FIG. 5B or FIG. 5C) are used in the training dataset).

Figure 5A:
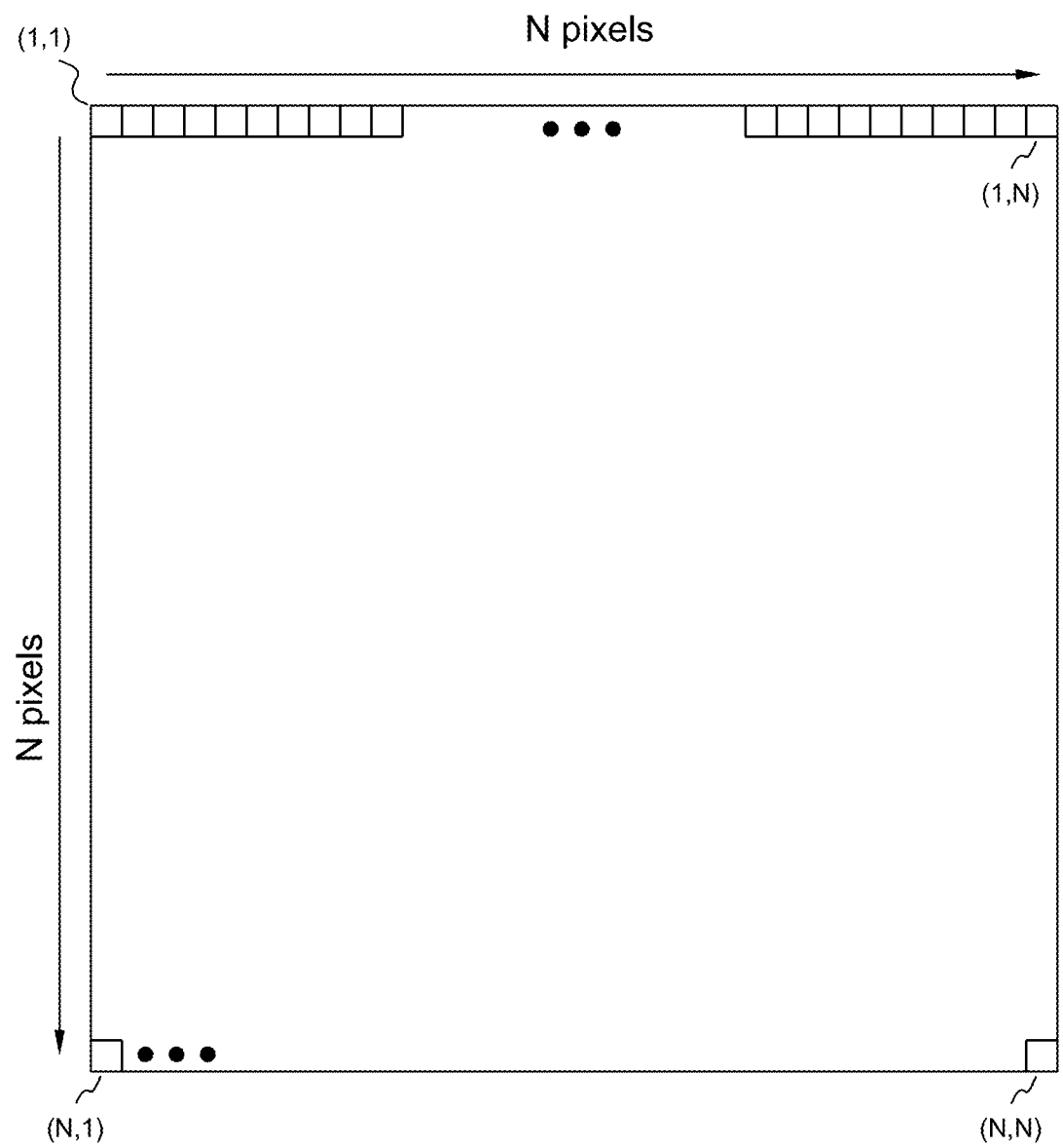
FIG. 5A is a diagram showing data structure of an example two-dimensional (2-D) graphical symbol in accordance with an embodiment of the invention.

The data structure of an example 2-D graphical symbol 500 is shown in FIG. 5A for facilitating machine learning of a semantic meaning contained therein. The 2-D graphical symbol 500 comprises a matrix of N×N pixels (i.e., N columns by N rows) of data. Pixels are ordered with row first and column second as follows: (1,1), (1,2), (1,3), ... (1,N), (2,1), ... , (N,1), (N,N). N is a positive integer. In one embodiment, N is a multiple of 224. In another embodiment, N is a multiple of 320.

Figure 5B:
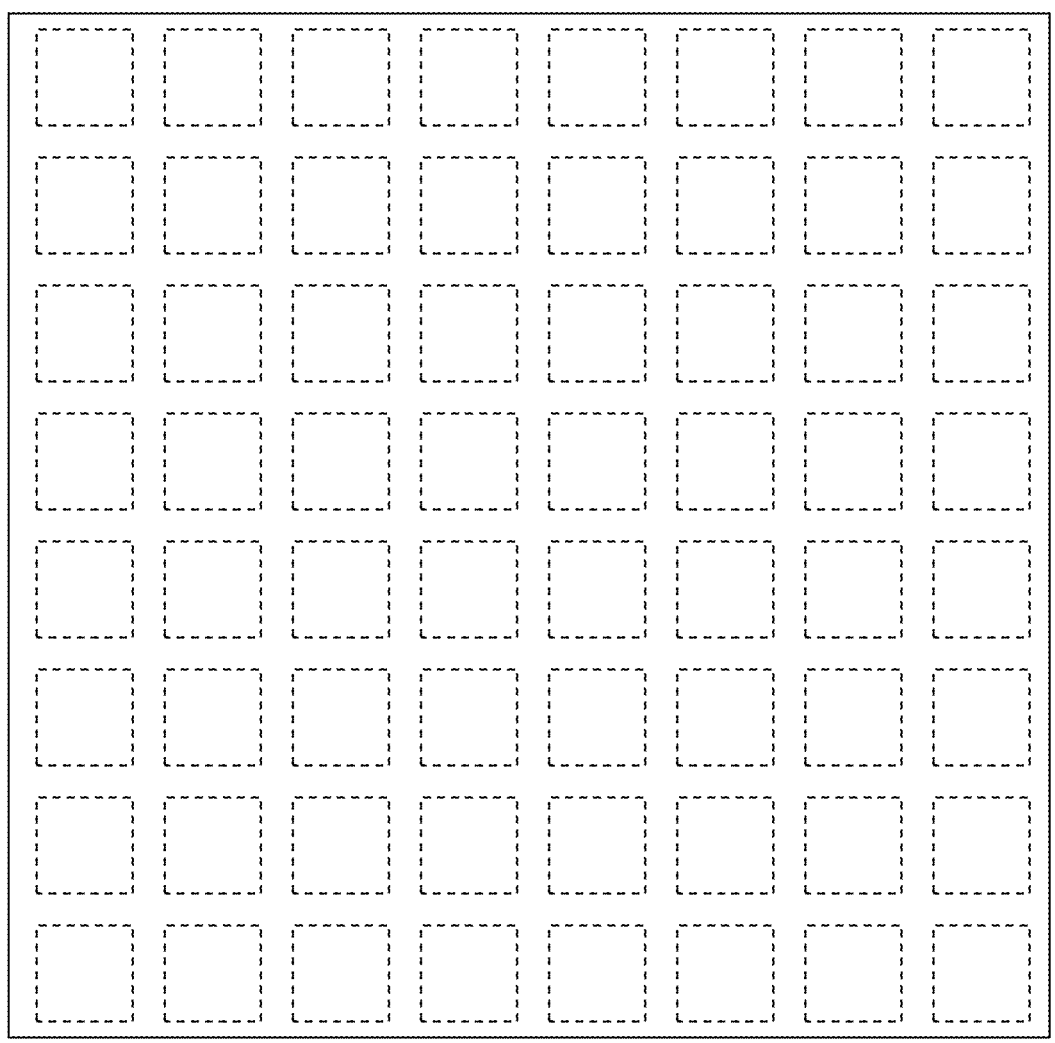
FIG. 5B is a diagram showing a first example data arrangement pattern that arranges all of the P feature encoding values of each frame in a square format such that there are Q square images contained in the 2-D graphical symbol according to an embodiment of the invention.
Figure 6A:
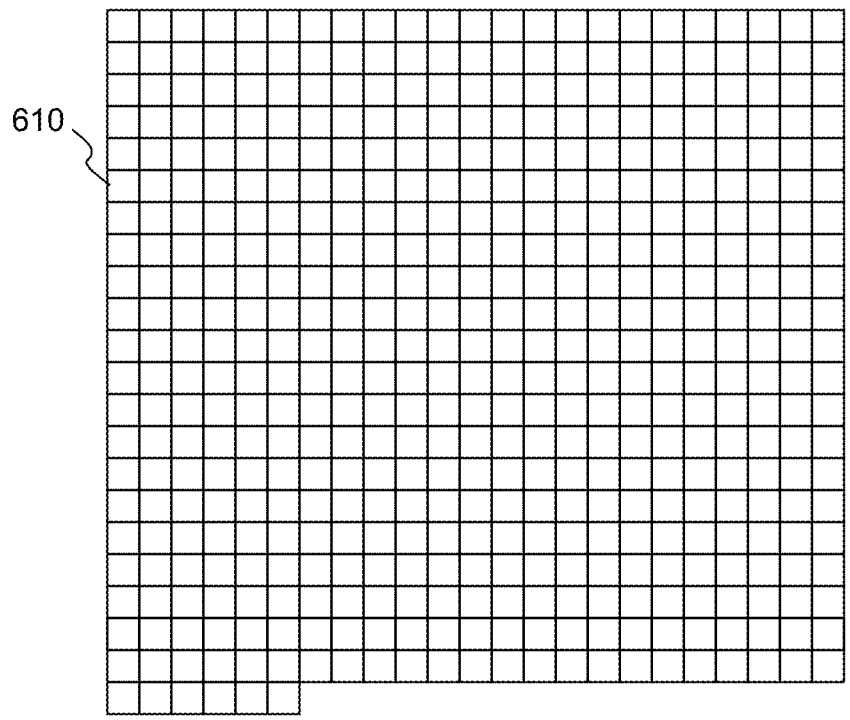
FIGS. 6A-6C are diagrams of example data structures of images within each example data arrangement patterns according to an embodiment of the invention.

FIG. 5B shows a first example data arrangement pattern 520 that represents P feature encoding values of all Q frames comprises arranging all of the P feature encoding values of each frame in a square format such that there are Q square images contained in the 2-D graphical symbol. Each of the Q square images represents P feature encoding values of a corresponding one of the Q frames. An example data structure 610 of the square image is shown in FIG. 6A, which is for a 2-D graphical symbol having 224×224 pixels with 512 feature encoding values and 64 frames. One pixel is used for representing each of the 512 feature encoding values. 512 pixels are required to store 512 feature encoding values. The square data structure 610 contains 23×23 pixels or a total of 529 pixels with 17 unused pixels in the bottom row, which is large enough to hold 512 feature encoding values in form of grayscale display intensity (not shown). In other words, each pixel has specific grayscale display intensity in the range between 0 and 255. A gap of 5 pixels is used for separating Q or 64 square images from one another shown in the first example data arrangement pattern 520. Each pixel is filled with corresponding color display intensity to represent different feature encoding values.

Figure 5C:
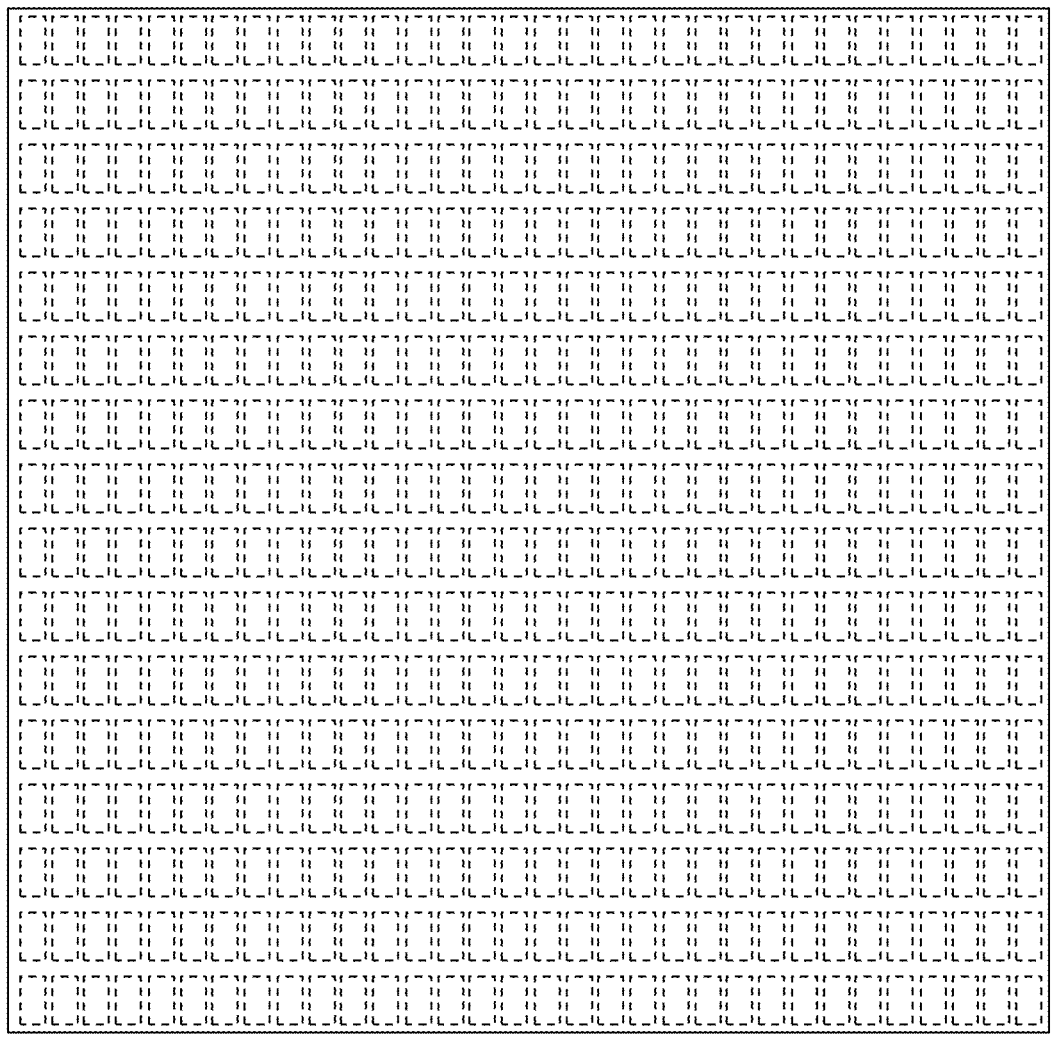
FIG. 5C is a diagram showing a second example data arrangement pattern arranges each of the P feature encoding values of all Q frames in a rectangular format such that there are P rectangular images contained in the 2-D graphical symbol according to an embodiment of the invention.
Figure 6B:
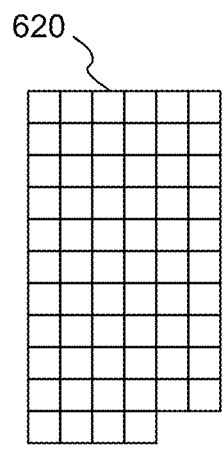

FIG. 5C shows a second example data arrangement pattern 540 for representing all frames of the video clip comprises arranging each of the P feature encoding values of all Q frames in a rectangular format such that there are P rectangular images contained in the 2-D graphical symbol. An example data structure 620 of the rectangular image is shown in FIG. 6B, which is for a 2-D graphical symbol having 224×224 pixels with 512 feature encoding values and 64 frames. One pixel is used for representing each of the 512 feature encoding values. 64 pixels are required to store one of the feature encoding values for all frames. The rectangular data structure 620 contains 6×11 pixels or a total of 66 pixels with 2 unused pixels in the bottom row, which is large enough to hold 64 feature encoding values in form of grayscale display intensity (not shown). In other words, each pixel would have a specific grayscale display intensity in the range between 0 and 255. A horizontal gap of 1 pixel and a vertical gap of 3 pixels are used for separating P or 512 rectangular images from one another shown in the second example data arrangement pattern 540 (figure shown is not in scale).

Figure 6C:
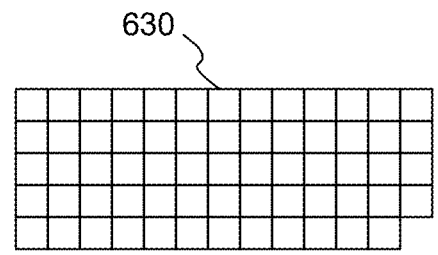

FIG. 6C shows an alternative data structure 630 of the rectangular image. The data structure contains 13×5 pixels or 65 pixels with one unused pixel in the bottom row. Similarly, each pixel is filled with corresponding color display intensity to represent different feature encoding values Due to the size of a 2-D graphical symbol, only a limited number of frames can be used in a video clip. For example, when N is 224, P is 512, the maximum number of frames or Q is 78 with a gap of at least one pixel. Each of the 512 rectangular images contains 6×13=78 pixels.

Figure 16:
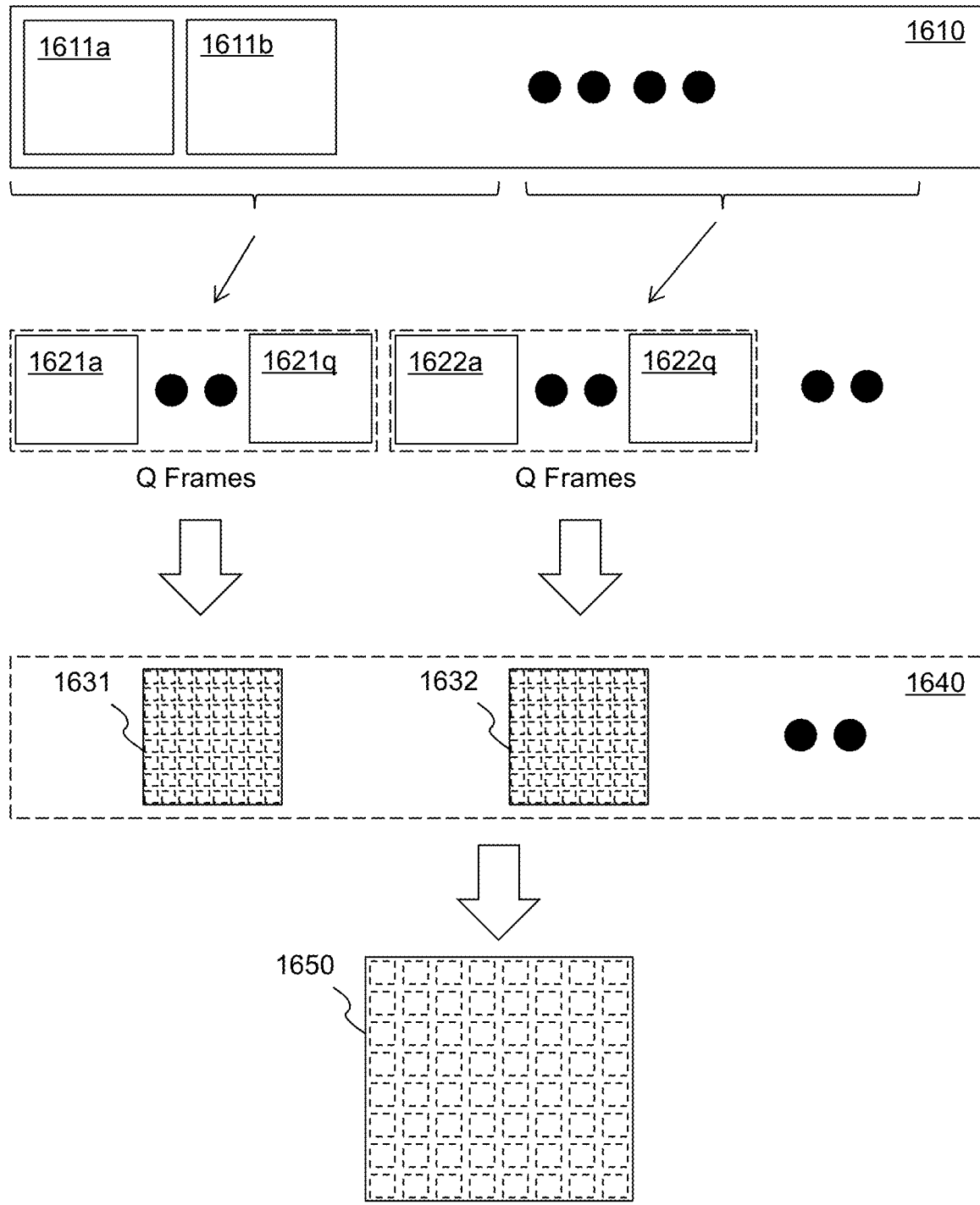
FIG. 16 is a schematic diagram showing at least two example video clips are extracted out of a video stream for creating a 2-D graphical symbol in accordance with an embodiment of the invention.

To overcome such a limitation, two or more video clips may be extracted from a video stream 1610 as shown in FIG. 16. Each video clip contains a maximum of Q frames (e.g., 64 frames), for example, the first video clip containing frames 1621*a*-1621*q*, the second video clip containing frames 1622*a*-1622*q*, and so on. Any of the selection schemes shown in FIGS. 2A-2C may be used for forming these video clips. In another example, it can also be 16 frames per video clip, when 4 pixels are used to represent each feature encoding value. And there are many other variations.

Each video clip is then transformed into a 2-D graphical symbol by applying the 2-D graphical symbol creation method shown in FIG. 1. For example, the first video clip 1621*a*-1621*q* containing Q frames is represented by the first 2-D graphical symbol 1631, and the second video clip 1622*a*-1622*q* containing Q frames is represented by the second 2-D graphical symbol 1632, and so on. At least two video clips represented by first and second 2-D graphical symbols 1631-1632 are included and formed a new video clip 1640. Applying the combination of image transformation, a specific succession of convolution and pooling layers and nested invariance layer, P feature encoding values are obtained for each frame (i.e., 2-D graphical symbols 1631, 1632, . . . ) in the new video clip 1640. Then, the new video clip 1640 in turn can be represented by another 2-D graphical image 1650. As a result of these combinations, semantic meaning of the video clips is contained in the final 2-D graphical symbol 1650. Applying this process recursively, there is no limit as to how many frames in a video stream may be represented in a 2-D graphical symbol.

Figure 17:
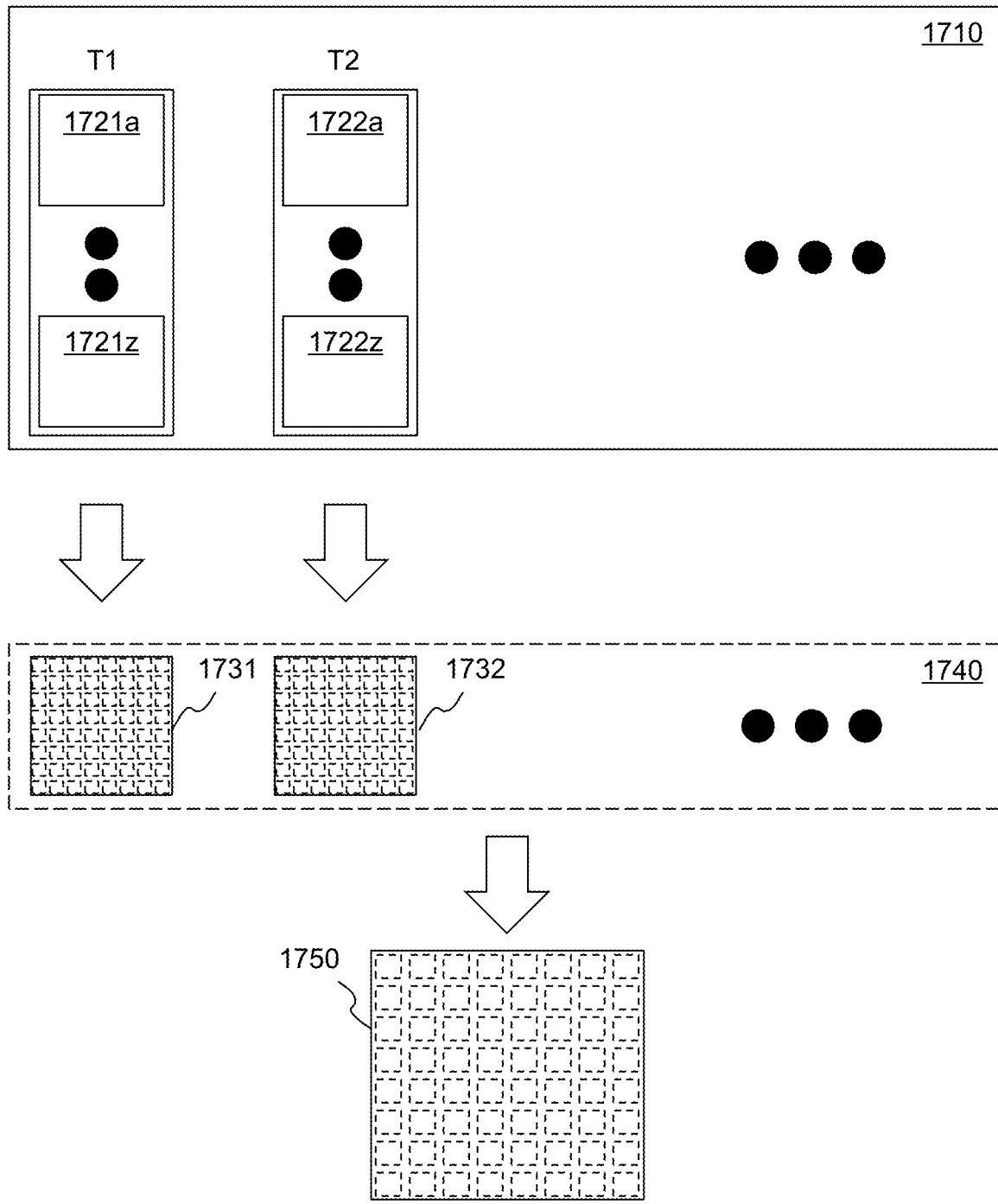
FIG. 17 is a schematic diagram showing a 2-D graphical symbol is formed for containing semantic meaning of an example four-dimensional data in accordance with one embodiment of the invention.

Furthermore, the world we live in contains four dimensions: three-dimension (3-D) objects in spatial plus another dimension for temporal. At any instance in time, a 3-D object is represented by a number of 2-D still images. For example, images of a 3-D object can be scanned via various technologies, for example, magnetic resonant imaging, computer axial tomography (CT), Light Detection and Ranging (LiDAR) and the likes. Scanned 3-D object results are then represented by a number of 2-D image frames. FIG. 17 shows an example four-dimensional data 1710 which is a stream of data with multiple frames at each time instance (i.e., T1, T2, etc). At T1, there are multiple frames 1721*a*-1721*z*, at T2, there are also the same number of frames 1722*a*-1722*z*, and so on. In one example, there are 64 frames at each time instance. Using the 2-D graphical symbol creation method shown in FIG. 1, 2-D image frames at a particular instance in time can be represented by a 2-D graphical symbol, for example, frames 1721*a*-1721*z* are represented by a first 2-D graphical symbol 1731, frames 1722*a*-1722*z* are represented by a second 1-D graphical symbol 1732. A new video clip 1740 is then formed by including at least two of these 2-D graphical symbols 1731, 1732. Process 100 can be used for forming another 2-D graphical image 1750 that possesses semantic meaning of the four-dimensional data 1700.

Figure 7:
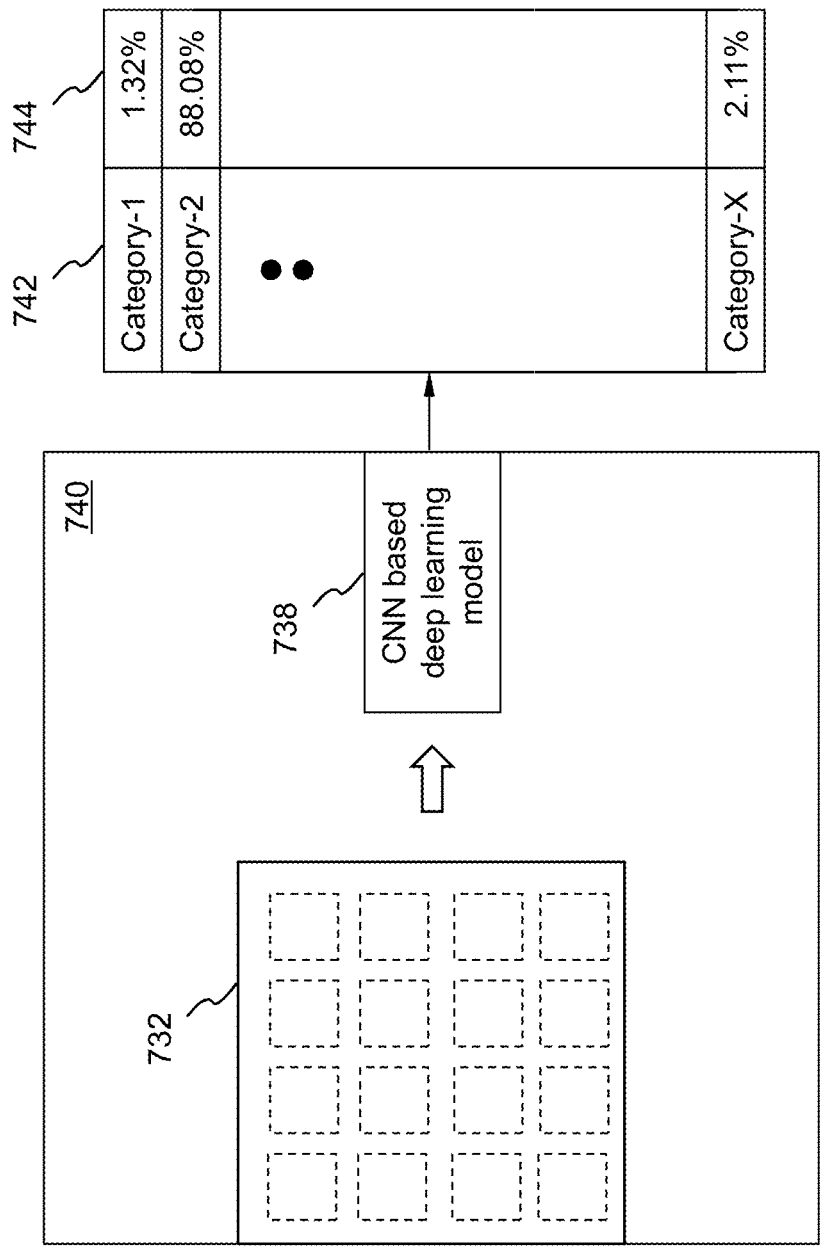
FIG. 7 is a schematic diagram showing an example image classification of a 2-D graphical symbol in accordance with an embodiment of the invention.

FIG. 7 is a schematic diagram showing an example image classification scheme of a 2-D graphical symbol 732 in a computing system 740 (e.g., computing system 800 in FIG. 8A) capable of performing computations of a CNN based deep learning model 738. The 2-D graphical symbol 732 is formed to contain a semantic meaning a video clip. The semantic meaning is defined as one of the categories 742 (i.e., Category-1, Category-2, . . . , Category-X). Since the video clip contains an action or motion act, the categories reflect those possible actions (e.g., "a person swims in freestyle", "a person is jumping", etc.). In other words, each action in a training database is a labeled category. In general, many, sometimes one million or more, sample video clips are used in a training database. Trained filter coefficients are then used in the CNN based deep learning model for identifying a 2-D graphical symbol as a category with highest probability 744. In the example shown in FIG. 7, the highest probability is 88.08% for "Category-2".

Referring now to FIG. 8A, it is shown a block diagram illustrating an example CNN based computing system 800 configured for classifying a two-dimensional symbol.

The CNN based computing system 800 may be implemented on integrated circuits as a digital semi-conductor chip (e.g., a silicon substrate in a single semi-conductor wafer) and contains a controller 810, and a plurality of CNN processing units 802*a*-802*b* operatively coupled to at least one input/output (I/O) data bus 820. Controller 810 is configured to control various operations of the CNN processing units 802*a*-802*b*, which are connected in a loop with a clock-skew circuit (e.g., clock-skew circuit 1540 in FIG. 15).

In one embodiment, each of the CNN processing units 802*a*-802*b* is configured for processing imagery data, for example, 2-D graphical symbol 520 of FIG. 5B or 2-D graphical symbol 540 of FIG. 5C.

Figure 8B:
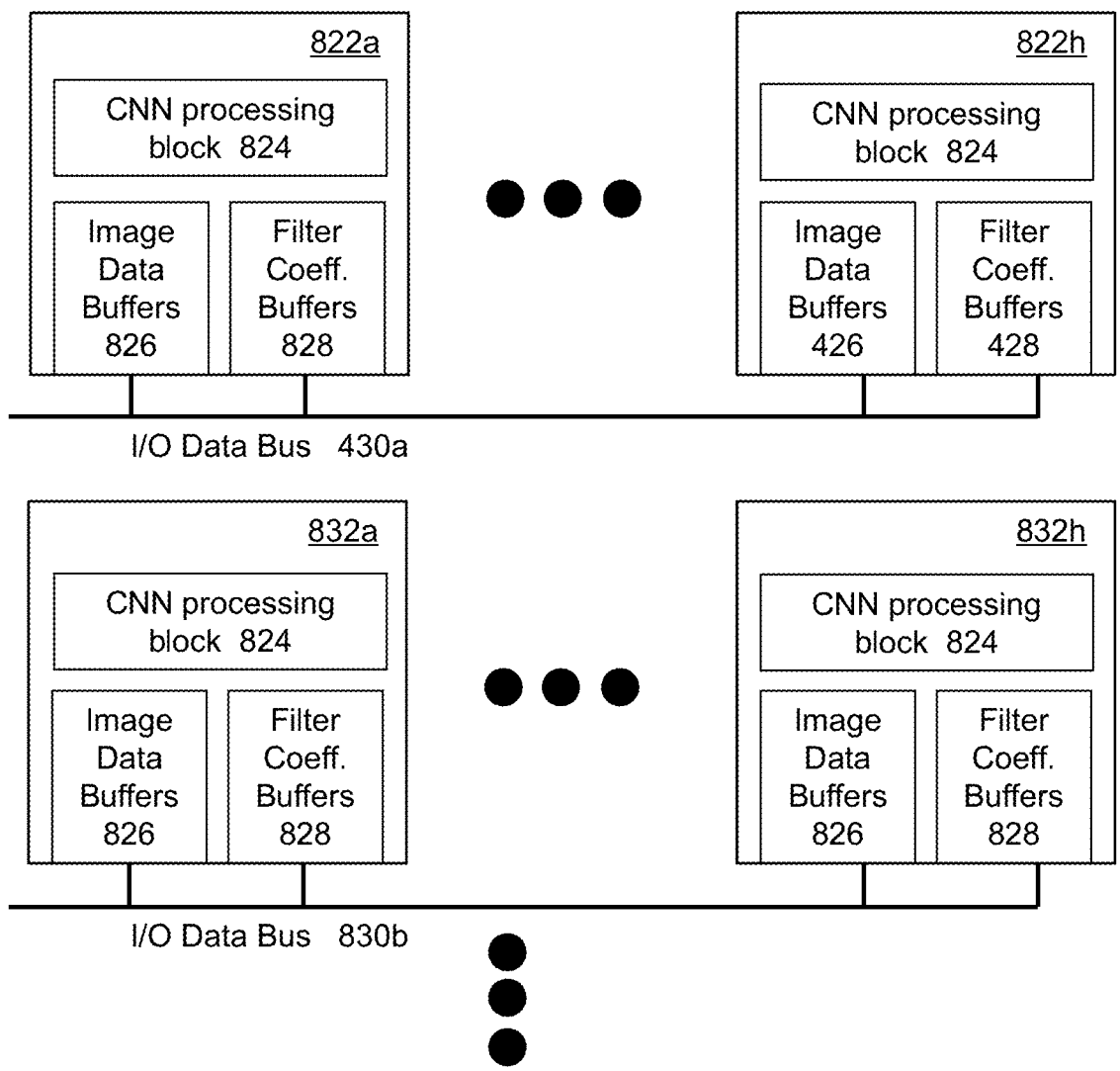
FIG. 8B is a block diagram illustrating an example CNN based integrated circuit for performing image processing based on convolutional neural networks, according to one embodiment of the invention.

In another embodiment, the CNN based computing system is a digital integrated circuit that can be extendable and scalable. For example, multiple copies of the digital integrated circuit may be implemented on a single semi-conductor chip as shown in FIG. 8B. In one embodiment, the single semi-conductor chip is manufactured in a single semi-conductor wafer.

All of the CNN processing engines are identical. For illustration simplicity, only few (i.e., CNN processing engines 822*a*-822*h*, 832*a*-832*h*) are shown in FIG. 8B. The invention sets no limit to the number of CNN processing engines on a digital semi-conductor chip.

Each CNN processing engine 822*a*-822*h*, 832*a*-832*h* contains a CNN processing block 824, a first set of memory buffers 826 and a second set of memory buffers 828. The first set of memory buffers 826 is configured for receiving imagery data and for supplying the already received imagery data to the CNN processing block 824. The second set of memory buffers 828 is configured for storing filter coefficients and for supplying the already received filter coefficients to the CNN processing block 824. In general, the number of CNN processing engines on a chip is $2^n$, where n is an integer (i.e., 0, 1, 2, 3, . . . ). As shown in FIG. 8B, CNN processing engines 822*a*-822*h* are operatively coupled to a first input/output data bus 830*a* while CNN processing engines 832*a*-832*h* are operatively coupled to a second input/output data bus 830*b*. Each input/output data bus 830a-830b is configured for independently transmitting data (i.e., imagery data and filter coefficients). In one embodiment, the first and the second sets of memory buffers comprise random access memory (RAM), which can be a combination of one or more types, for example, Magnetic Random Access Memory, Static Random Access Memory, etc. Each of the first and the second sets are logically defined. In other words, respective sizes of the first and the second sets can be reconfigured to accommodate respective amounts of imagery data and filter coefficients.

The first and the second I/O data bus 830a-830b are shown here to connect the CNN processing engines 822a-822h, 832a-832h in a sequential scheme. In another embodiment, the at least one I/O data bus may have different connection scheme to the CNN processing engines to accomplish the same purpose of parallel data input and output for improving performance.

Figure 8C:
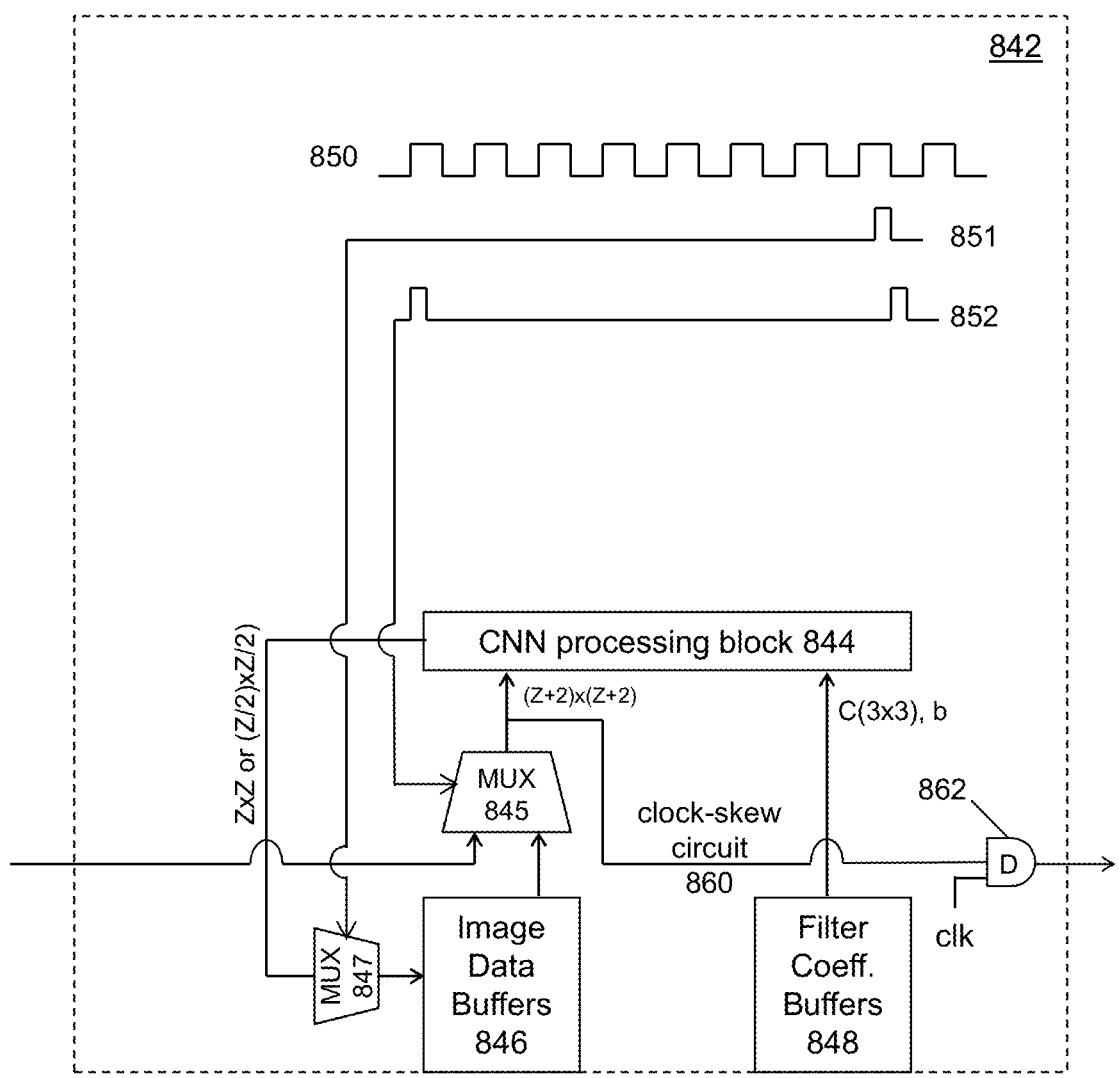
FIG. 8C is a diagram showing an example CNN processing engine in a CNN based integrated circuit, according to one embodiment of the invention.

More details of a CNN processing engine 842 in a CNN based integrated circuit are shown in FIG. 8C. A CNN processing block 844 contains digital circuitry that simultaneously obtains Z×Z convolution operations results by performing 3×3 convolutions at Z×Z pixel locations using imagery data of a (Z+2)-pixel by (Z+2)-pixel region and corresponding filter coefficients from the respective memory buffers. The (Z+2)-pixel by (Z+2)-pixel region is formed with the Z×Z pixel locations as an Z-pixel by Z-pixel central portion plus a one-pixel border surrounding the central portion. Z is a positive integer. In one embodiment, Z equals to 14 and therefore, (Z+2) equals to 16, Z×Z equals to 14×14=196, and Z/2 equals 7.

Figure 9:
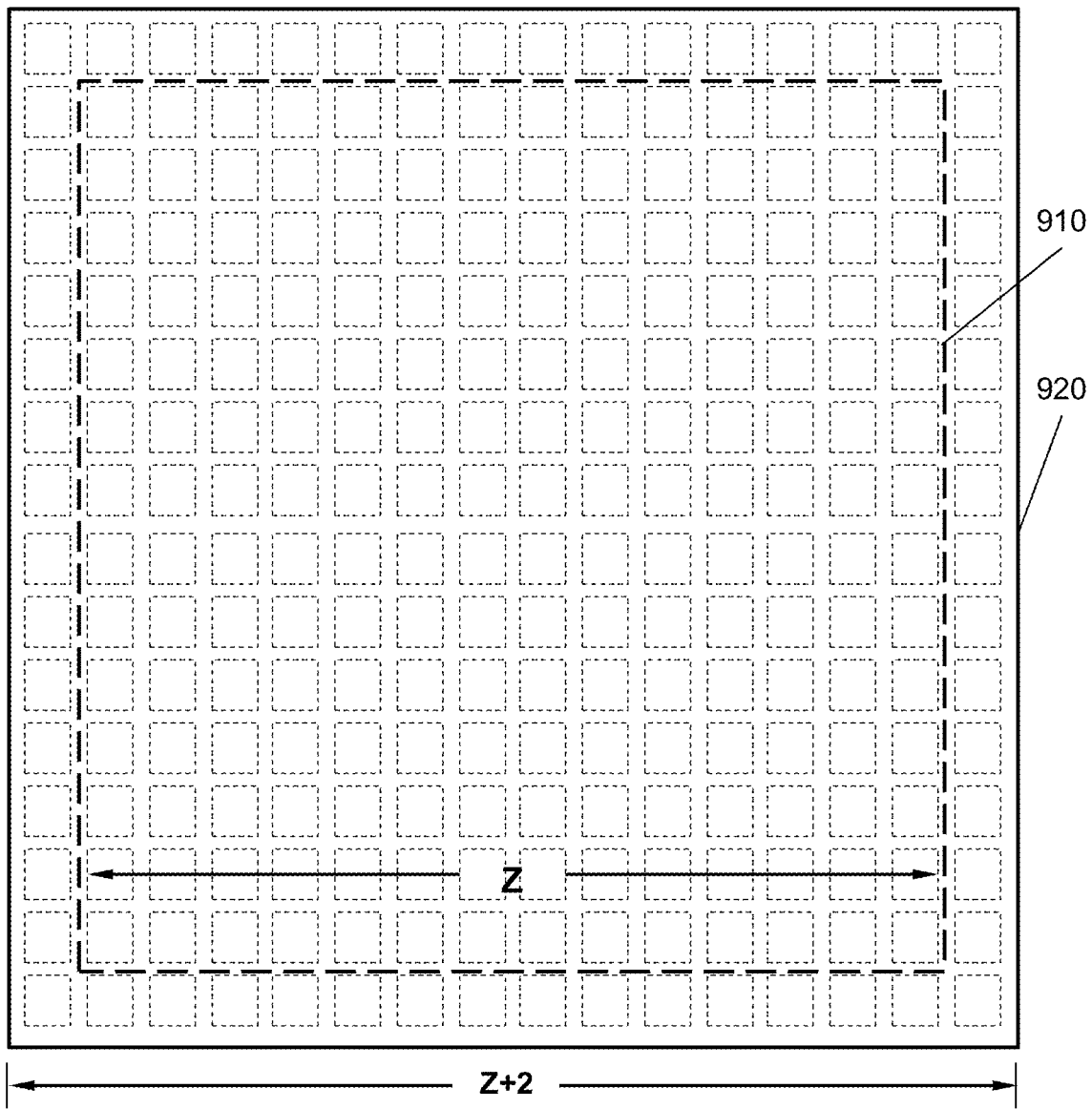
FIG. 9 is a diagram showing an example imagery data region within the example CNN processing engine of FIG. 8C, according to an embodiment of the invention.

FIG. 9 is a diagram showing a diagram representing (Z+2)-pixel by (Z+2)-pixel region 910 with a central portion of Z×Z pixel locations 920 used in the CNN processing engine 842.

In order to achieve faster computations, few computational performance improvement techniques have been used and implemented in the CNN processing block 844. In one embodiment, representation of imagery data uses as few bits as practical (e.g., 5-bit representation). In another embodiment, each filter coefficient is represented as an integer with a radix point. Similarly, the integer representing the filter coefficient uses as few bits as practical (e.g., 12-bit representation). As a result, 3×3 convolutions can then be performed using fixed-point arithmetic for faster computations.

Each 3×3 convolution produces one convolution operations result, Out(m, n), based on the following formula:

$$\mathrm{Out}(m, n) = \sum_{1 \leq i, j \leq 3} \mathrm{In}(m, n, i, j) \times C(i, j) - b \quad (1)$$

where:
 m, n are corresponding row and column numbers for identifying which imagery data (pixel) within the (Z+2)-pixel by (Z+2)-pixel region the convolution is performed;
 In(m,n,i,j) is a 3-pixel by 3-pixel area centered at pixel location (m, n) within the region;
 C(i, j) represents one of the nine weight coefficients C(3×3), each corresponds to one of the 3-pixel by 3-pixel area;
 b represents an offset coefficient; and
 i, j are indices of weight coefficients C(i, j).

Each CNN processing block 844 produces Z×Z convolution operations results simultaneously and, all CNN processing engines perform simultaneous operations. In one embodiment, the 3×3 weight or filter coefficients are each 12-bit while the offset or bias coefficient is 16-bit or 18-bit.

Figure 10A:
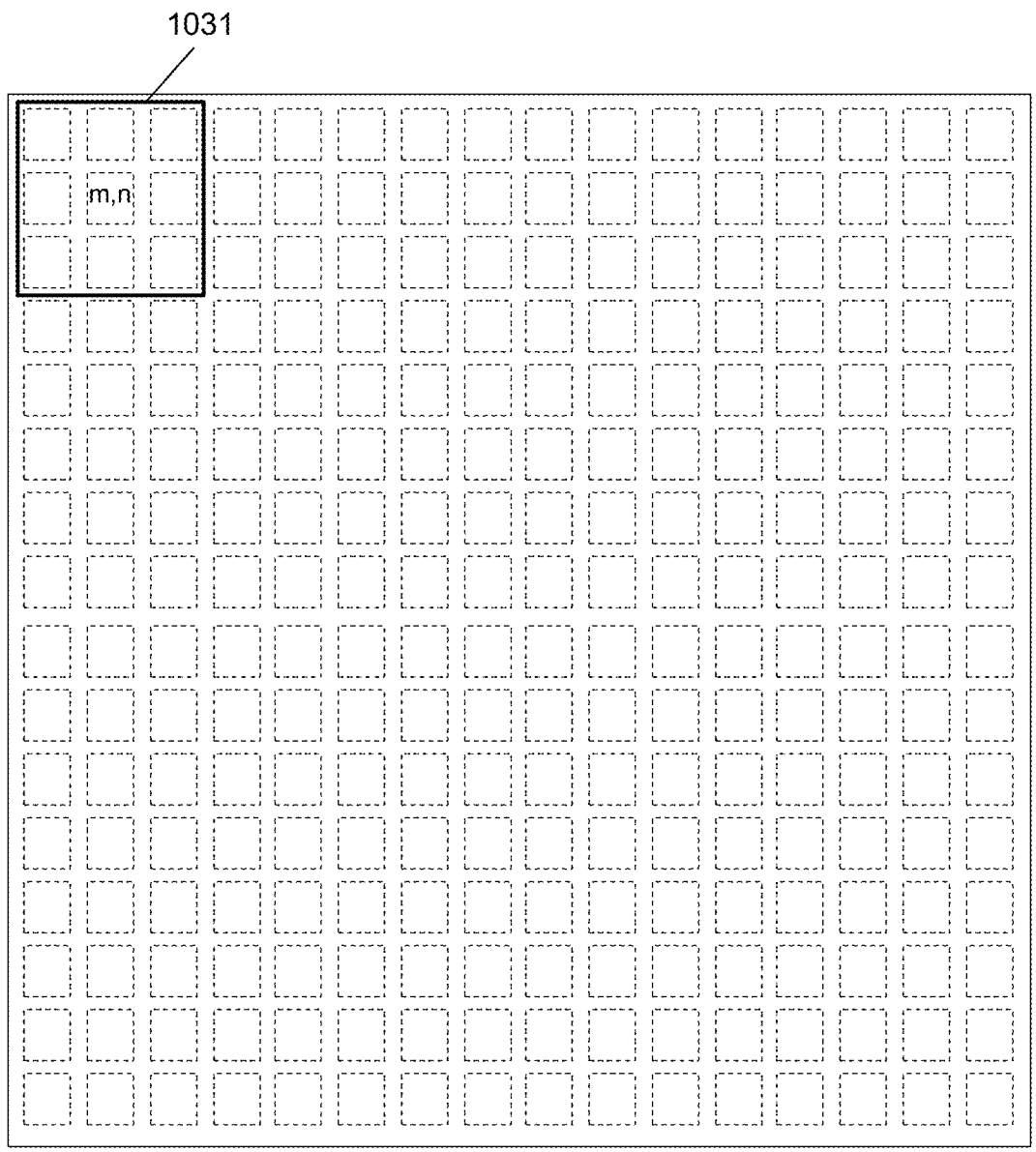
FIGS. 10A-10C are diagrams showing three example pixel locations within the example imagery data region of FIG. 9, according to an embodiment of the invention.
Figure 10B:
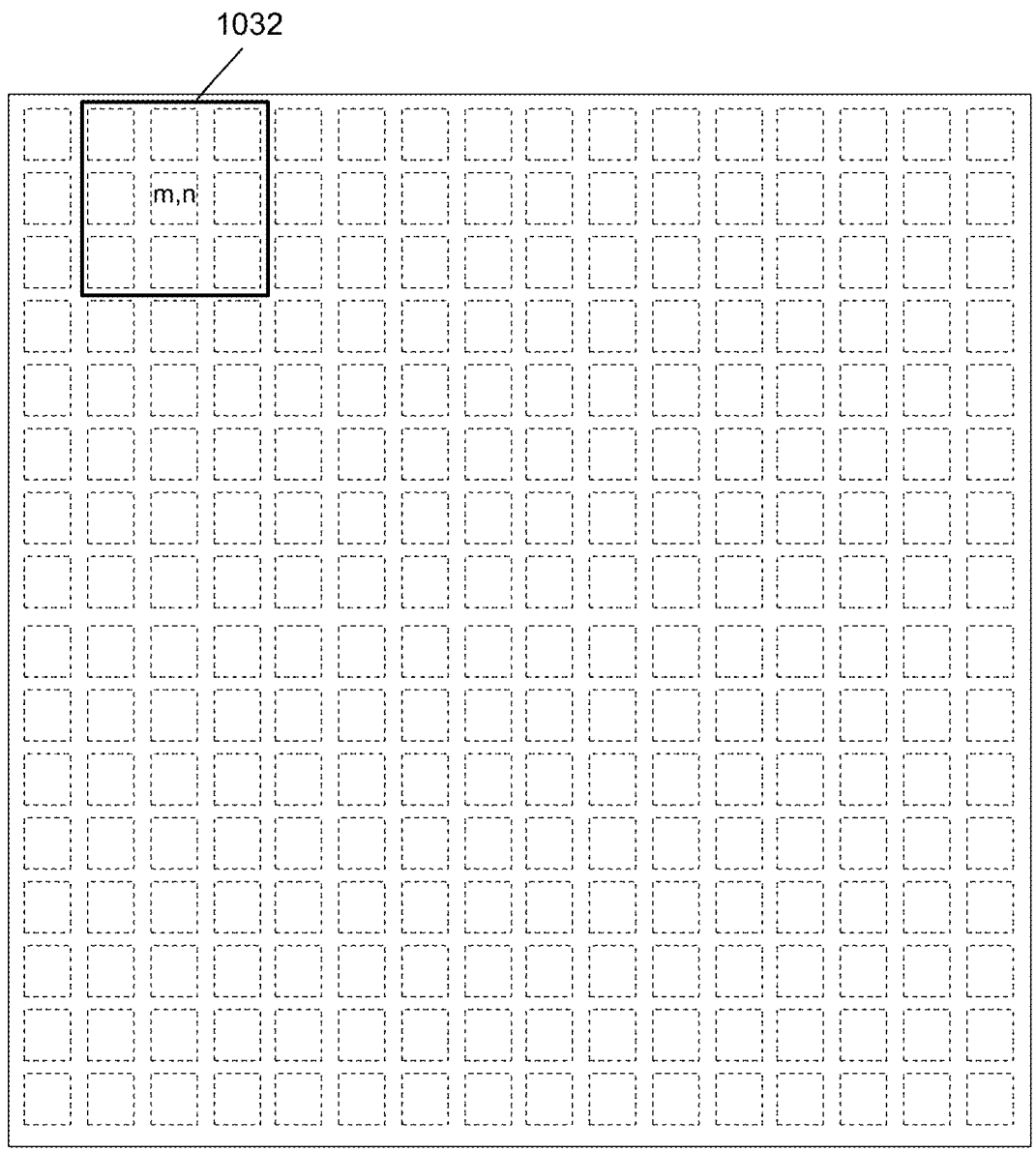
Figure 10C:
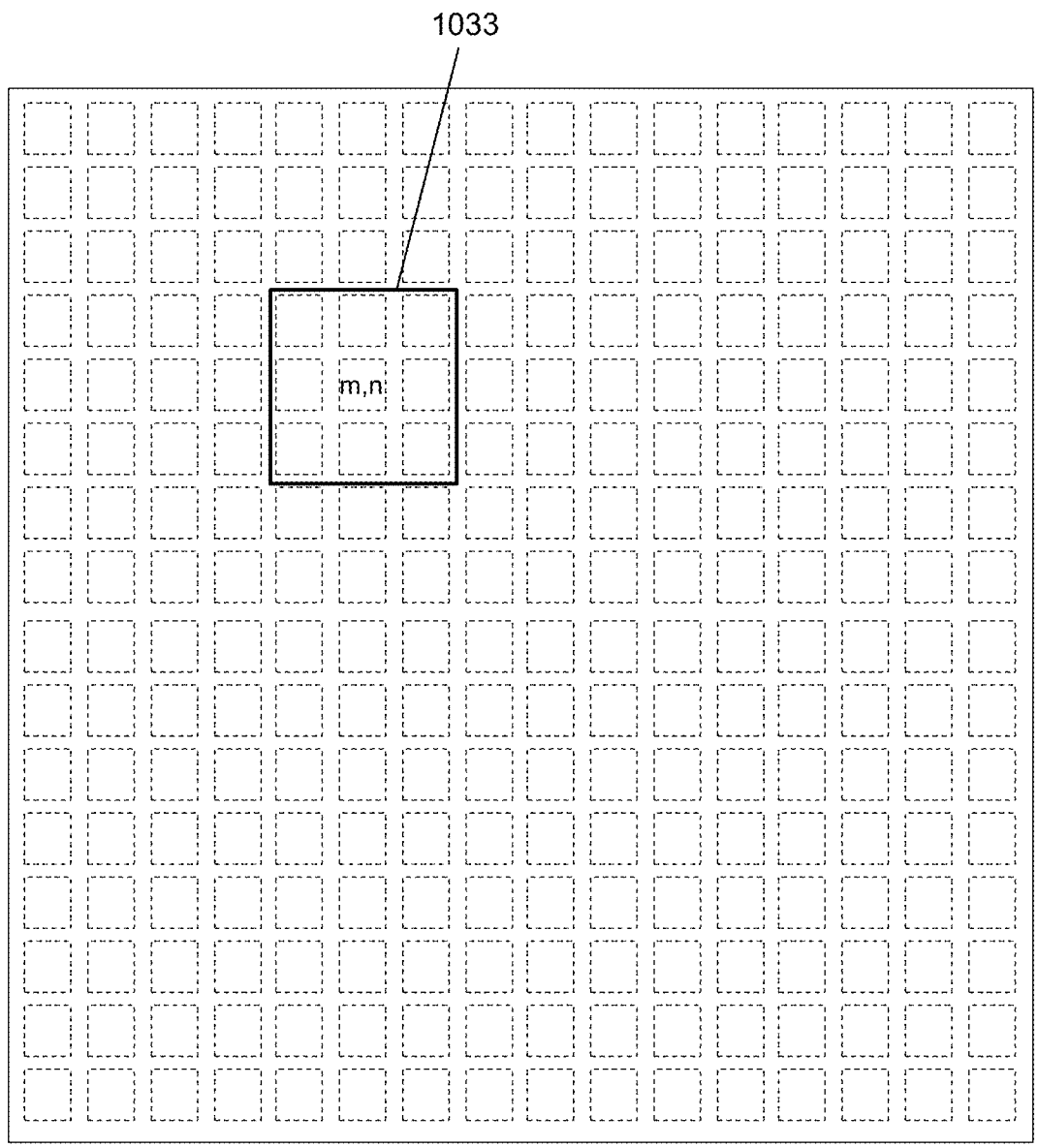

FIGS. 10A-10C show three different examples of the Z×Z pixel locations. The first pixel location 1031 shown in FIG. 10A is in the center of a 3-pixel by 3-pixel area within the (Z+2)-pixel by (Z+2)-pixel region at the upper left corner. The second pixel location 1032 shown in FIG. 10B is one pixel data shift to the right of the first pixel location 1031. The third pixel location 1033 shown in FIG. 10C is a typical example pixel location. Z×Z pixel locations contain multiple overlapping 3-pixel by 3-pixel areas within the (Z+2)-pixel by (Z+2)-pixel region.

Figure 11:
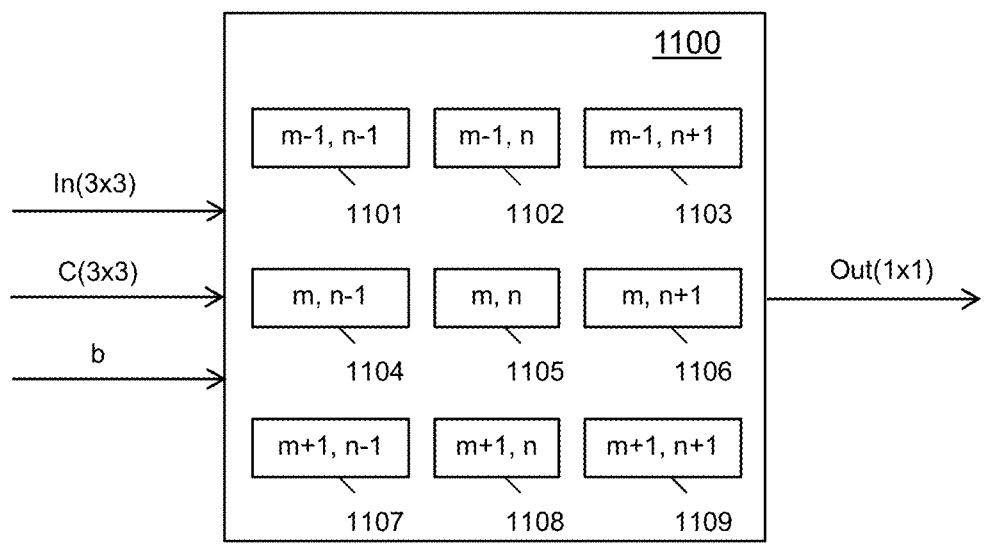
FIG. 11 is a diagram illustrating an example data arrangement for performing 3×3 convolutions at a pixel location in the example CNN processing engine of FIG. 8C, according to one embodiment of the invention.

To perform 3×3 convolutions at each sampling location, an example data arrangement is shown in FIG. 11. Imagery data (i.e., In(3×3)) and filter coefficients (i.e., weight coefficients C(3×3) and an offset coefficient b) are fed into an example CNN 3×3 circuitry 1100. After 3×3 convolutions operation in accordance with Formula (1), one output result (i.e., Out(1×1)) is produced. At each sampling location, the imagery data In(3×3) is centered at pixel coordinates (m, n) 1105 with eight immediate neighbor pixels 1101-1104, 1106-1109.

Imagery data are stored in a first set of memory buffers 846, while filter coefficients are stored in a second set of memory buffers 848. Both imagery data and filter coefficients are fed to the CNN block 844 at each clock of the digital integrated circuit. Filter coefficients (i.e., C(3×3) and b) are fed into the CNN processing block 844 directly from the second set of memory buffers 848. However, imagery data are fed into the CNN processing block 844 via a multiplexer MUX 845 from the first set of memory buffers 846. Multiplexer 845 selects imagery data from the first set of memory buffers based on a clock signal (e.g., pulse 852).

Otherwise, multiplexer MUX 845 selects imagery data from a first neighbor CNN processing engine (from the left side of FIG. 8C not shown) through a clock-skew circuit 860.

At the same time, a copy of the imagery data fed into the CNN processing block 844 is sent to a second neighbor CNN processing engine (to the right side of FIG. 8C not shown) via the clock-skew circuit 860. Clock-skew circuit 860 can be achieved with known techniques (e.g., a D flip-flop 862).

After 3×3 convolutions for each group of imagery data are performed for predefined number of filter coefficients, convolution operations results Out(m, n) are sent to the first set of memory buffers via another multiplex MUX 847 based on another clock signal (e.g., pulse 851). An example clock cycle 850 is drawn for demonstrating the time relationship between pulse 851 and pulse 852. As shown pulse 851 is one clock before pulse 852, as a result, the 3×3 convolution operations results are stored into the first set of memory buffers after a particular block of imagery data has been processed by all CNN processing engines through the clock-skew circuit 860.

After the convolution operations result Out(m, n) is obtained from Formula (1), activation procedure may be performed. Any convolution operations result, Out(m, n), less than zero (i.e., negative value) is set to zero. In other words, only positive value of output results are kept. For example, positive output value 10.5 retains as 10.5 while −2.3 becomes 0. Activation causes non-linearity in the CNN based integrated circuits.

If a 2×2 pooling operation is required, the Z×Z output results are reduced to (Z/2)×(Z/2). In order to store the (Z/2)×(Z/2) output results in corresponding locations in the first set of memory buffers, additional bookkeeping techniques are required to track proper memory addresses such that four (Z/2)×(Z/2) output results can be processed in one CNN processing engine.

Figure 12A:
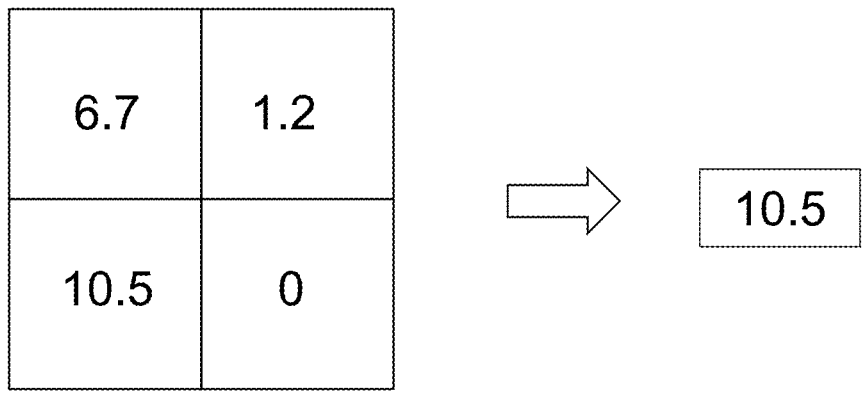
FIGS. 12A-12B are diagrams showing two example 2×2 pooling operations according to an embodiment of the invention.
Figure 12B:
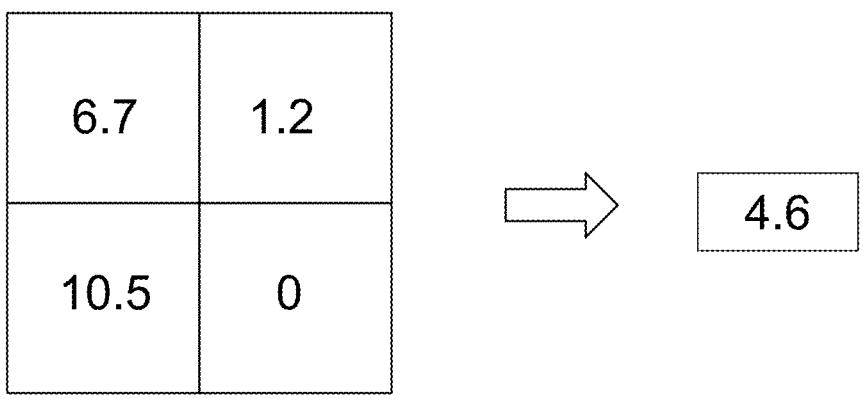
Figure 13:
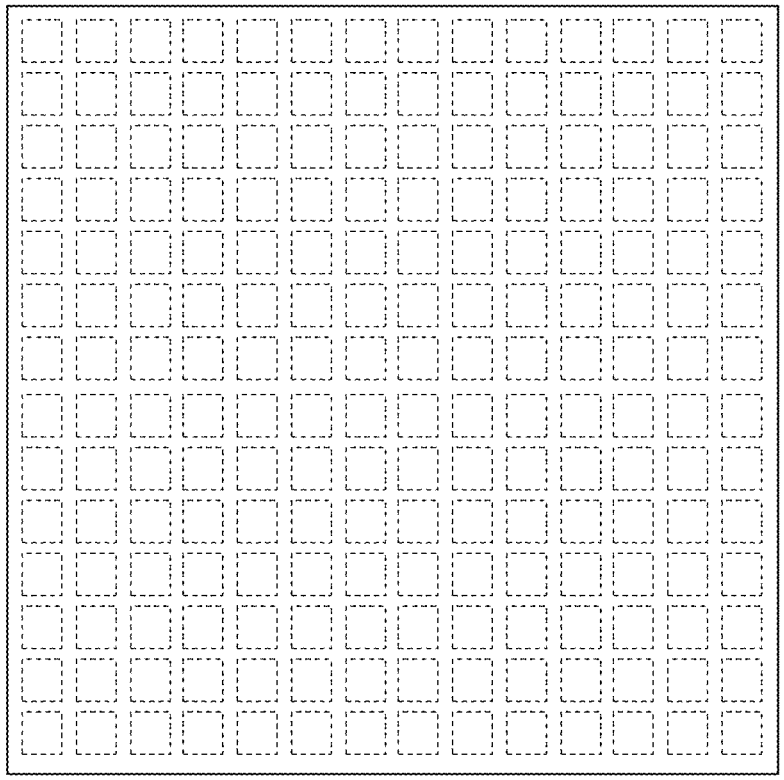
FIG. 13 is a diagram illustrating a 2×2 pooling operation of an imagery data in the example CNN processing engine of FIG. 8C, according to one embodiment of the invention.
Figure 13:
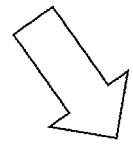
Figure 13:
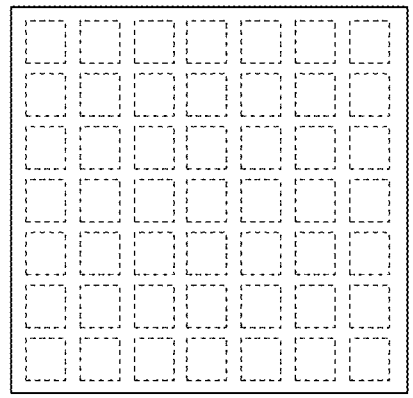

To demonstrate a 2×2 pooling operation, FIG. 12A is a diagram graphically showing first example output results of a 2-pixel by 2-pixel block being reduced to a single value 10.5, which is the largest value of the four output results. The technique shown in FIG. 12A is referred to as "max pooling". When the average value 4.6 of the four output results is used for the single value shown in FIG. 12B, it is referred to as "average pooling". There are other pooling operations, for example, "mixed max average pooling" which is a combination of "max pooling" and "average pooling". The main goal of the pooling operation is to reduce size of the imagery data being processed. FIG. 13 is a diagram illustrating Z×Z pixel locations, through a 2×2 pooling operation, being reduced to (Z/2)×(Z/2) locations, which is one fourth of the original size.

Figure 14A:
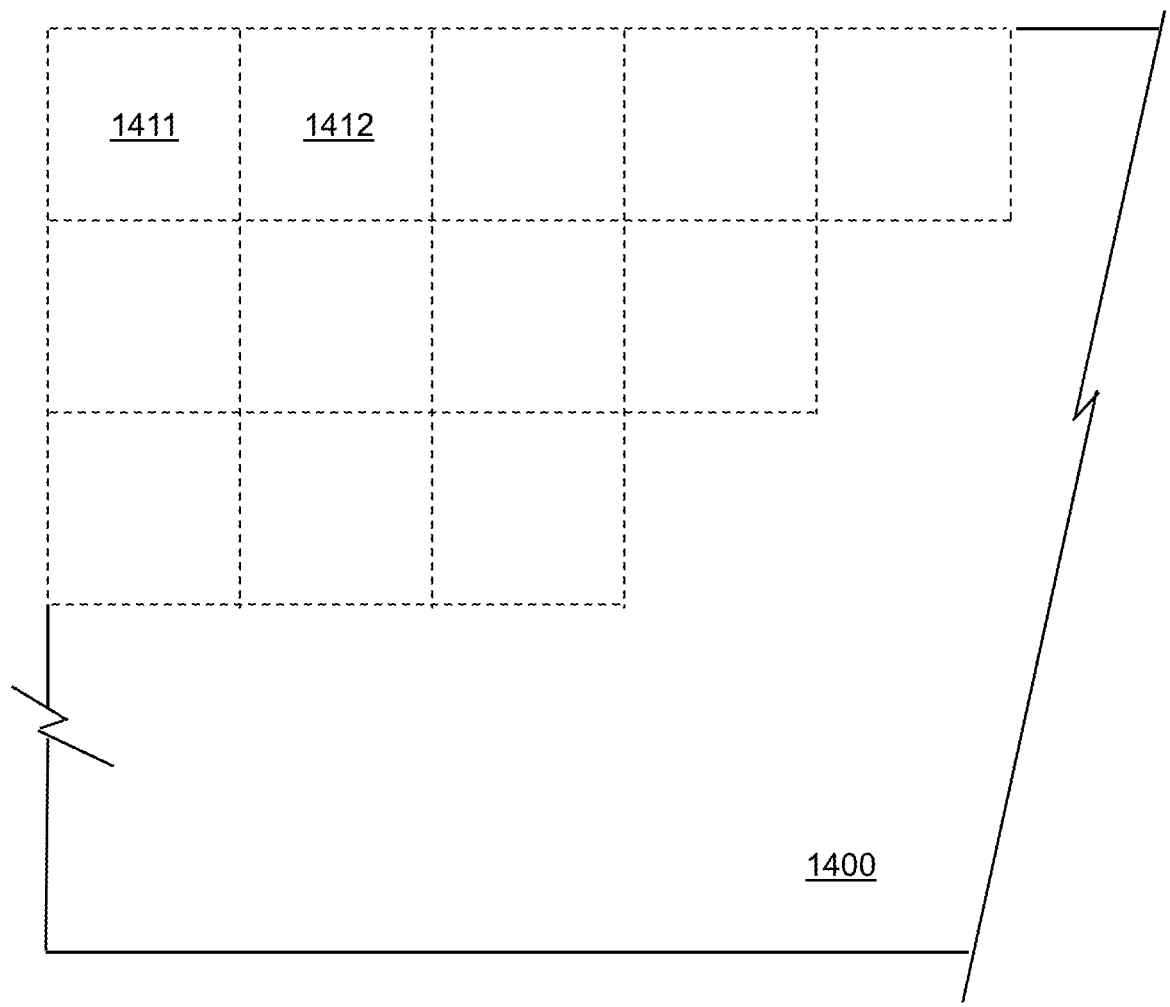
FIGS. 14A-14C are diagrams illustrating various examples of imagery data region within an input image, according to one embodiment of the invention.

An input image generally contains a large amount of imagery data. In order to perform image processing operations, an example input image 1400 (e.g., 2-D graphical symbol 520 of FIG. 5B, 2-D graphical symbol 540 of FIG. 5C) is partitioned into Z-pixel by Z-pixel blocks 1411-1412 as shown in FIG. 14A. Imagery data associated with each of these Z-pixel by Z-pixel blocks is then fed into respective CNN processing engines. At each of the Z×Z pixel locations in a particular Z-pixel by Z-pixel block, 3×3 convolutions are simultaneously performed in the corresponding CNN processing block.

Although the invention does not require specific characteristic dimension of an input image, the input image may be required to resize to fit into a predefined characteristic dimension for certain image processing procedures. In an embodiment, a square shape with $(2^L \times Z)$-pixel by $(2^L \times Z)$-pixel is required. L is a positive integer (e.g., 1, 2, 3, 4, etc.). When Z equals 14 and L equals 4, the characteristic dimension is 224. In another embodiment, the input image is a rectangular shape with dimensions of $(2^I \times Z)$-pixel and $(2^J \times Z)$-pixel, where I and J are positive integers.

Figure 14B:
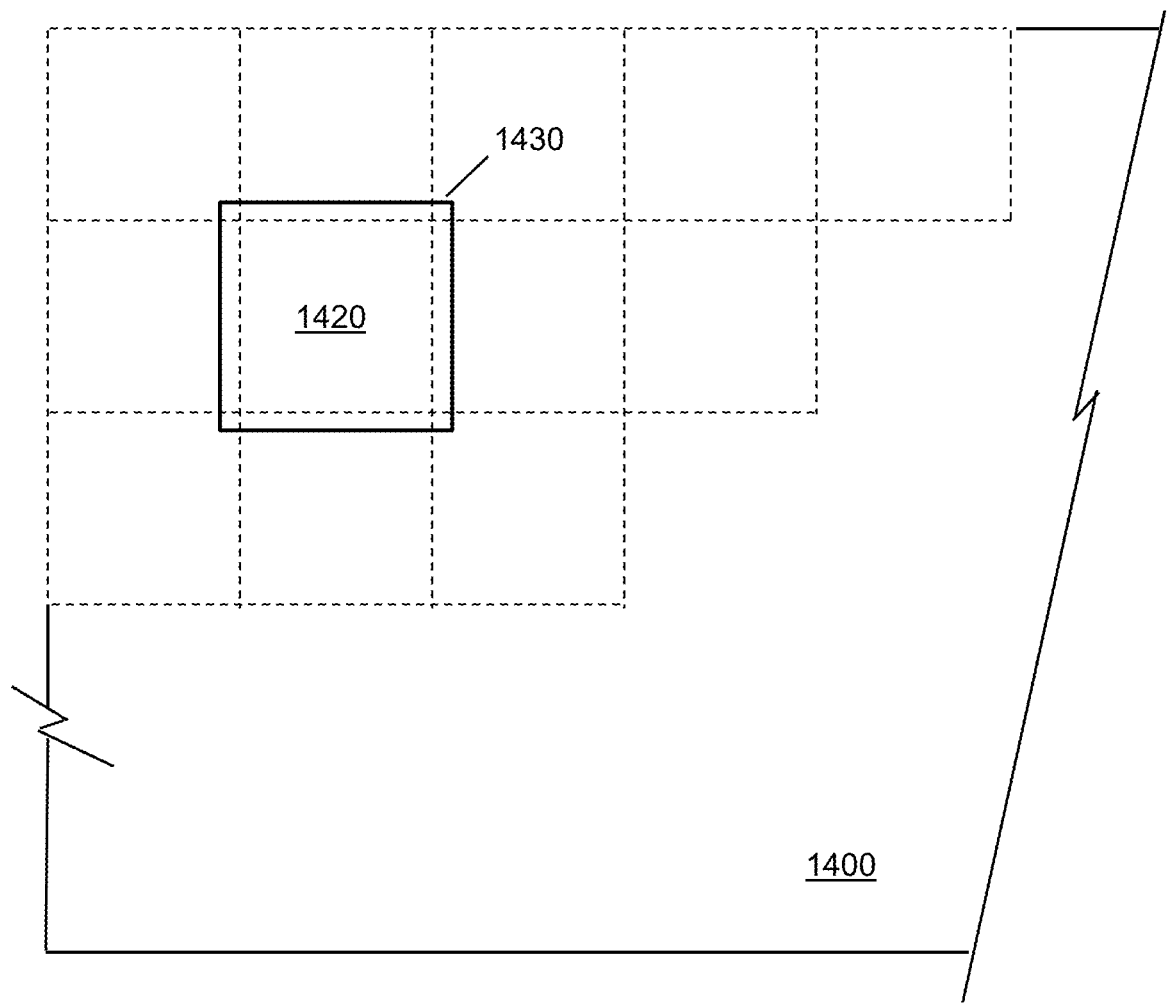

In order to properly perform 3×3 convolutions at pixel locations around the border of a Z-pixel by Z-pixel block, additional imagery data from neighboring blocks are required. FIG. 14B shows a typical Z-pixel by Z-pixel block 1420 (bordered with dotted lines) within a (Z+2)-pixel by (Z+2)-pixel region 1430. The (Z+2)-pixel by (Z+2)-pixel region is formed by a central portion of Z-pixel by Z-pixel from the current block, and four edges (i.e., top, right, bottom and left) and four corners (i.e., top-left, top-right, bottom-right and bottom-left) from corresponding neighboring blocks.

Figure 14C:
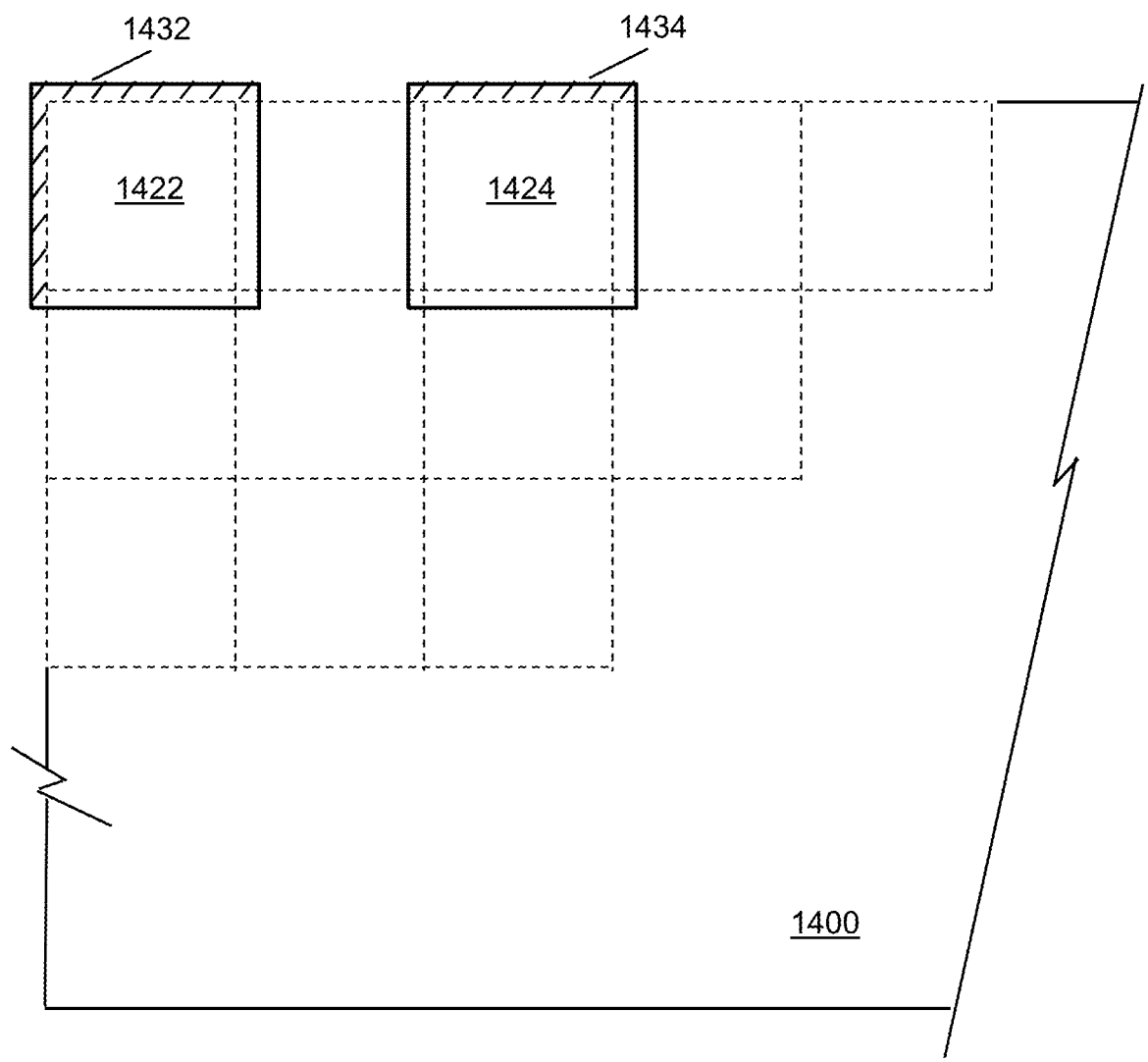

FIG. 14C shows two example Z-pixel by Z-pixel blocks 1422-1424 and respective associated (Z+2)-pixel by (Z+2)-pixel regions 1432-1434. These two example blocks 1422-1424 are located along the perimeter of the input image. The first example Z-pixel by Z-pixel block 1422 is located at top-left corner, therefore, the first example block 1422 has neighbors for two edges and one corner. Value "0"s are used for the two edges and three corners without neighbors (shown as shaded area) in the associated (Z+2)-pixel by (Z+2)-pixel region 1432 for forming imagery data. Similarly, the associated (Z+2)-pixel by (Z+2)-pixel region 1434 of the second example block 1424 requires "0"s be used for the top edge and two top corners. Other blocks along the perimeter of the input image are treated similarly. In other words, for the purpose to perform 3×3 convolutions at each pixel of the input image, a layer of zeros ("0"s) is added outside of the perimeter of the input image. This can be achieved with many well-known techniques. For example, default values of the first set of memory buffers are set to zero. If no imagery data is filled in from the neighboring blocks, those edges and corners would contain zeros.

Figure 15:
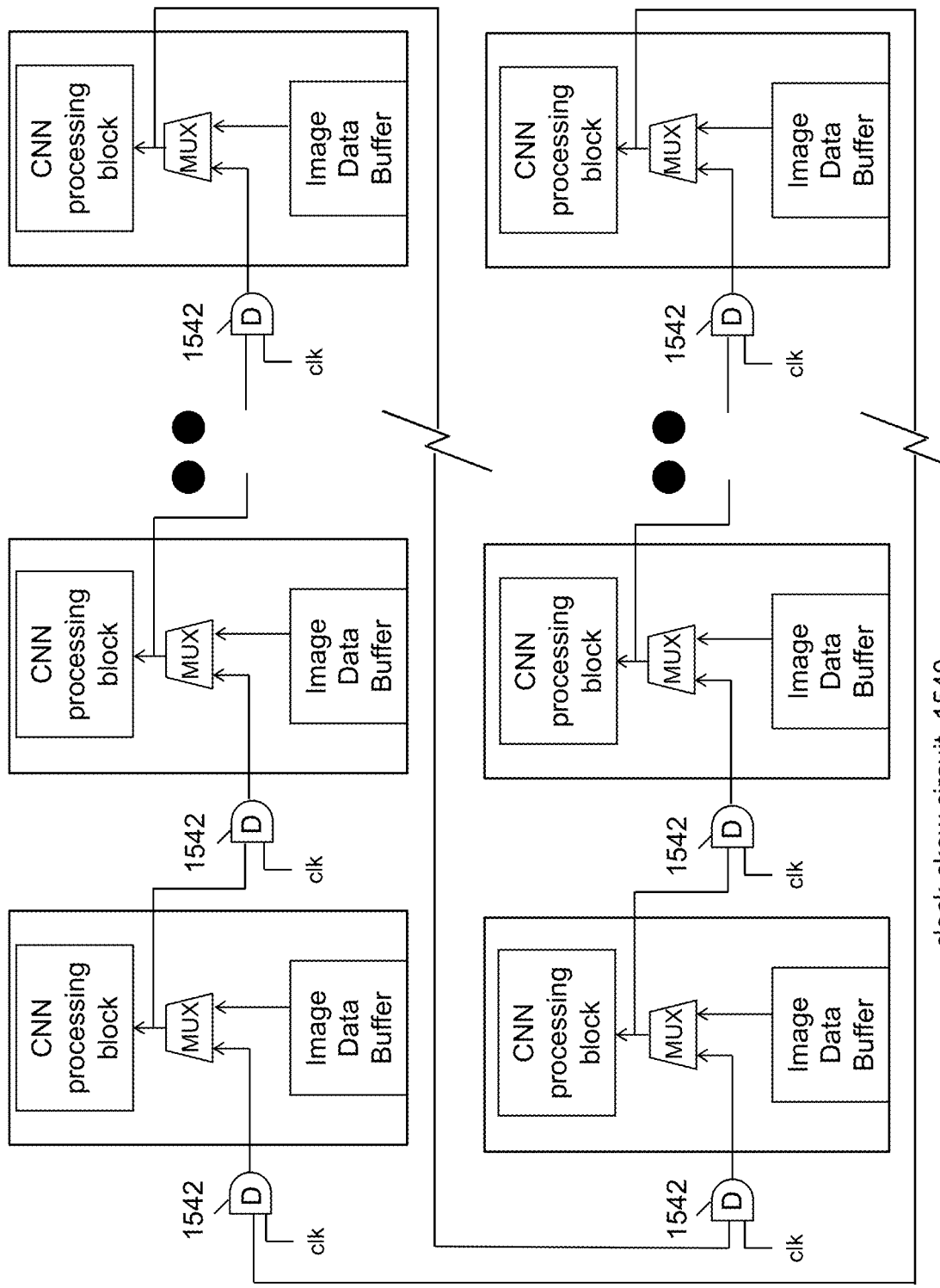
FIG. 15 is a diagram showing a plurality of CNN processing engines connected as a loop via an example clock-skew circuit in accordance of an embodiment of the invention.

When more than one CNN processing engine is configured on the integrated circuit. The CNN processing engine is connected to first and second neighbor CNN processing engines via a clock-skew circuit. For illustration simplicity, only CNN processing block and memory buffers for imagery data are shown. An example clock-skew circuit 1540 for a group of example CNN processing engines are shown in FIG. 15.

CNN processing engines connected via the second example clock-skew circuit 1540 to form a loop. In other words, each CNN processing engine sends its own imagery data to a first neighbor and, at the same time, receives a second neighbor's imagery data. Clock-skew circuit 1540 can be achieved with well-known manners. For example, each CNN processing engine is connected with a D flip-flop 1542.

Although the invention has been described with reference to specific embodiments thereof, these embodiments are merely illustrative, and not restrictive of, the invention. Various modifications or changes to the specifically disclosed example embodiments will be suggested to persons skilled in the art. For example, whereas the number of feature values has been shown and described as 512, other multiple of 512 may be used for achieving the same, for example, MobileNet contains 1024 feature encoding values. Furthermore, whereas data arrangement pattern containing square images have been shown in various examples, data arrangement pattern containing rectangular images may be used instead for accomplishing the same. In summary, the scope of the invention should not be restricted to the specific example embodiments disclosed herein, and all modifications that are readily suggested to those of ordinary skill in the art should be included within the spirit and purview of this application and scope of the appended claims.

What is claimed is:

1. A method of creating a two-dimension (2-D) graphical symbol for representing semantic meaning of a video clip comprising:

receiving a video stream in a computing system configured for performing computations of Cellular Neural Networks or Cellular Nonlinear Networks (CNN) based deep learning models, wherein the video stream includes a number of frames with each frame containing a 2-D image in time order;

extracting a video clip from the received the video stream, the video clip containing Q frames, where Q is a positive integer;

converting each frame to a resolution suitable as an input image to a first CNN based deep learning model;

obtaining a vector of P feature encoding values of each frame by a set of image transformations of each frame along with performing computations of a specific succession of convolution and pooling layers of the first CNN based deep learning model followed with operations of a nested invariance pooling layer, wherein the feature encoding values are real numbers, and P is a multiple of 512;

converting each of the P feature encoding values from the real number to a corresponding integer value within a range designated for color display intensity in accordance with a quantization scheme; and forming a two-dimension (2-D) graphical symbol that contains N×N pixels by placing respective color display intensities into the N×N pixels according to a data arrangement pattern for representing all frames of the video clip in form of P×Q feature encoding values, such that the 2-D graphical symbol possesses a semantic meaning of the video clip and the semantic meaning can be recognized via a second CNN based deep learning model with a set of trained filter coefficients, where N is a positive integer.

2. The method of claim 1, wherein the semantic meaning of the video clip comprises an action.

3. The method of claim 1, wherein the Q frames are sequentially chosen from the video stream.

4. The method of claim 1, wherein the Q frames are arbitrarily chosen from the video stream and rearranged in time order.

5. The method of claim 1, wherein the CNN based deep learning model is based on VGG(Visual Geometry Group)-16 model that contains 13 convolution layers and 5 max pooling layers.

6. The method of claim 1, wherein the quantization scheme is a non-linear quantization based on K-means clustering of each of the P feature encoding values obtained using a training dataset.

7. The method of claim 1, wherein the quantization scheme is a linear quantization based on boundaries determined by empirical observations of all of the feature encoding values obtained using a training dataset.

8. The method of claim 1, wherein the data arrangement pattern for representing all frames of the video clip comprises arranging all of the P feature encoding values of each frame in a square format such that there are Q square images contained in the 2-D graphical symbol.

9. The method of claim 8, wherein the Q square images are separated from one another by at least one pixel.

10. The method of claim 1, wherein the data arrangement pattern for representing all frames of the video clip comprises arranging each of the P feature encoding values of all Q frames in a rectangular format such that there are P rectangular images contained in the 2-D graphical symbol.

11. The method of claim 10, wherein the P rectangular images are separated from one another by at least one pixel.

12. The method of claim 1, wherein the Q frames are so chosen that the P feature encoding values of all Q frames can be fit within the 2-D graphical symbol.

13. The method of claim 1, wherein the computing system comprises a semi-conductor chip containing digital circuits dedicated for performing the convolutional neural networks algorithm.

* * * * *